US008763265B2

(12) United States Patent
Herniman et al.

(10) Patent No.: US 8,763,265 B2
(45) Date of Patent: Jul. 1, 2014

(54) COMBINATION SQUARE

(75) Inventors: Ean Herniman, Marayong (AU); Marc De Giulio, West Ryde (AU)

(73) Assignee: Marc + Muff Pty Ltd. (AU)

(*) Notice: Subject to any disclaimer, the term of this patent is extended or adjusted under 35 U.S.C. 154(b) by 301 days.

(21) Appl. No.: 13/401,353

(22) Filed: Feb. 21, 2012

(65) Prior Publication Data

US 2012/0180332 A1 Jul. 19, 2012

Related U.S. Application Data

(63) Continuation of application No. PCT/AU2010/001072, filed on Aug. 20, 2010.

(30) Foreign Application Priority Data

Aug. 20, 2009 (AU) ................... 2009903936

(51) Int. Cl.
*G01B 3/56* (2006.01)
*B43L 7/14* (2006.01)
*B43L 13/00* (2006.01)

(52) U.S. Cl.
CPC *G01B 3/566* (2013.01); *G01B 3/56* (2013.01); *B43L 7/14* (2013.01); *B43L 13/00* (2013.01)
USPC .......................................................... 33/480

(58) Field of Classification Search
CPC .......... G01B 3/566; G01B 3/56; B43L 13/00
USPC .................................................. 33/480, 464
See application file for complete search history.

(56) References Cited

U.S. PATENT DOCUMENTS

| 705,867 | A | | 7/1902 | Richardson | |
| 1,984,951 | A | * | 12/1934 | Stowell | 33/464 |
| 2,308,373 | A | * | 1/1943 | Malcolm | 33/419 |
| 2,404,911 | A | * | 7/1946 | King | 33/464 |
| 2,448,440 | A | * | 8/1948 | King | 33/427 |
| 2,797,491 | A | * | 7/1957 | Asperger | 33/427 |
| 3,334,498 | A | | 8/1967 | Barbee | |
| 3,510,950 | A | * | 5/1970 | Andrews | 33/418 |
| 3,533,165 | A | * | 10/1970 | Larsen | 33/427 |
| 5,339,530 | A | * | 8/1994 | Wright | 33/427 |
| 5,377,418 | A | * | 1/1995 | Anderson | 33/478 |
| 5,430,947 | A | | 7/1995 | Courtney | |
| 5,992,034 | A | | 11/1999 | Prucha | |
| 6,785,976 | B1 | * | 9/2004 | Morehouse | 33/480 |
| 2002/0088130 | A1 | * | 7/2002 | Szumer | 33/480 |
| 2007/0017108 | A1 | | 1/2007 | Hanson | |
| 2007/0204475 | A1 | * | 9/2007 | Marcus | 33/480 |
| 2007/0220764 | A1 | * | 9/2007 | Wolken | 33/427 |

* cited by examiner

*Primary Examiner* — Christopher Fulton
(74) *Attorney, Agent, or Firm* — Mayback & Hoffman, P.A.; Gregory L. Mayback; Thomas Bethea

(57) ABSTRACT

A combination square includes a blade, a body, and a lock. The body comprises a slot adapted to receive the blade therein and permit sliding translation of the blade parallel to the longitudinal axis of the blade, allowing the position of the blade to be adjusted relative to the body. The lock is adapted to lock the position of the blade relative to the body in a locked configuration and to allow adjustment of the position of the blade relative to the body in a released configuration. The combination square also comprises a removable extension bracket being wider than and removable from the body and comprising one or more working surfaces.

21 Claims, 17 Drawing Sheets

COMBINATION SQUARE

CROSS-REFERENCE TO RELATED APPLICATIONS

This application is a continuing application, under 35 U.S.C. §120, of copending international application No. PCT/AU10/01072, filed Aug. 20, 2010, which designated the United States and was published in English; this application also claims the priority, under 35 U.S.C. §119, of Australian patent application No. 2009903936, filed Aug. 20, 2009; the prior applications are herewith incorporated by reference in their entirety.

STATEMENT REGARDING FEDERALLY SPONSORED RESEARCH OR DEVELOPMENT

Not Applicable

FIELD OF THE INVENTION

The present invention relates to combination squares. The invention has been developed primarily for use in woodworking and metalworking and will be described hereinafter with reference to this application. However, it will be appreciated that the invention is not limited to these particular fields of use.

BACKGROUND OF THE INVENTION

A combination square is an instrument widely used by carpenters, mechanics, tool makers, artisans, handy men and the like, in woodworking and metalworking. The combination square is composed of a scaled blade and an adjustable body that typically slides in a longitudinal groove formed in the blade. The longitudinal position of the blade relative to the body may be releasably locked.

A number of combination squares are known to use a transverse rib, advanced by a thumbscrew to lock the position of the blade relative to the body. In these squares, the rib abuts against the groove of the blade. This can be cumbersome for the a number of reasons, some of which are set forth in the following text.

Considerable time and effort is required to tighten or loosen the thumbscrew when attempting to lock or release the position of the blade relative to the body.
1. The blade does not slide well once the transverse rib has been released.
2. The blade may easily slip free from the body once the transverse rib has been released.
3. Reinsertion of the transverse rib back into the groove is generally difficult.

Attempts to overcome the transverse rib problem have resulted in squares having a body that is clamped directly against the face of the blade, bearing a horizontal clamping force on the blade to secure the blade. In these squares, the horizontal clamping force acts on a comparatively random area on the blade, thereby reducing the accuracy of the combination square.

Additionally, a number of combination squares are known to be generally formed with smooth surfaces set at 90° and 45° which can abut a work piece, for constructing or checking 90° and 45° angles, respectively. One difficulty that exists when working with such squares occurs when a guiding surface of a work piece is not at perfect right angles to the working surface of the work piece on which markings or cuts are to be made. Examples include situations where a working surface and/or a work piece have radiused, chamfered, or otherwise irregular surfaces.

Thus, a need exists to overcome the problems with the prior art systems, designs, and processes as discussed above.

It is to be understood that, if any prior art information is referred to herein; such reference does not constitute an admission that the information forms part of the common general knowledge in the art, in Australia or any other country.

SUMMARY OF THE INVENTION

The present invention seeks to provide a combination square which will overcome or substantially ameliorate at least some of the deficiencies of the prior art, or to at least provide an alternative.

According to a first aspect of the present invention, a combination square is provided, comprising:
  a blade;
  a body comprising a slot adapted to receive the blade therein and permit sliding translation of the blade parallel to the longitudinal axis of the blade, allowing the position of the blade to be adjusted relative to the body; and
  a lock adapted to lock the position of the blade relative to the body in a locked configuration and to allow adjustment of the position of the blade relative to the body in a released configuration.

Advantageously, the body is generally formed with one or more smooth straight-edged surfaces set at predefined angles, for example, 90° and 45°, allowing the user to quickly construct or check the angles of a work piece.

Advantageously, the body has a guide flange along its one or more smooth straight-edged surfaces which can abut against a work piece such that marks or cuts can be rapidly made in the work piece.

Advantageously, the lock allows simple, quick and efficient locking and adjustment of the position of the blade relative to the body.

Advantageously, the body and lock are sized, shaped and relatively disposed to enable easy and swift operation with, for example, one hand.

Advantageously, the location of the lock in a generally medial position of the body allows the combination square to be operable by either left-handed or right-handed users.

Advantageously, the lock achieves reliable and secure releasable locking of the blade relative to the body to provide a combination square with a sturdy locking mechanism.

In an exemplary embodiment, the lock comprises a locking pin, the locking pin being moveable in the body in a direction generally parallel to the longitudinal axis of the body between a locked position where the lock is in the locked configuration and a released position where the lock is in the released configuration.

In an exemplary embodiment, the blade comprises a longitudinal groove formed therein, and the locking pin comprises a protrusion at an engagement end thereof, the protrusion being adapted to engage with and slide in the groove.

In an exemplary embodiment, the groove is generally dovetailed in cross-section and the protrusion is complementary in cross-section such that the protrusion is held within the groove.

Advantageously, the dovetailed cross-sections of the groove and the protrusion provide the blade with a desirable one degree of freedom when the lock is in the released configuration. This allows the blade to slide predictably within the slot of the body when the lock is in the released configuration.

Advantageously, the protrusion can be released from the groove at either ends of the blade allowing the blade to be removable from the body. This allows one or more additional blades to be interchangeably used with the combination square.

In an exemplary embodiment, the locking pin exerts a lateral clamping force on the blade via the protrusion when the locking pin is in the locked position and no clamping force when the locking pin is in the released position.

In an exemplary embodiment, the locking pin further comprises a transverse extension.

In an exemplary embodiment, the lock further comprises a locking arm rotatably mounted to the body and movable between a locked position, in which the lock is in the locked configuration, and an unlocked position, in which the lock is in the released configuration, and having a cam portion, and a clamp subassembly adapted to locate between the cam portion and the transverse extension, the clamp subassembly comprising a clamp member having a cam follower portion, the cam portion applying a force to the cam follower portion when the locking arm is in the locked position causing the locking pin to be held in the locked position and thus to maintain the lock in the locked configuration until the locking arm is moved towards the unlocked position.

Advantageously, the lock can be easily switched between the locked configuration and the released configuration using the locking arm while the combination square is in use.

Advantageously, the force applied by the cam portion is sufficient to maintain the lock in the locked configuration.

In an exemplary embodiment, the clamp subassembly further comprises a first biasing member located between the clamp member and the transverse extension.

Advantageously, the first biasing member biases the lock towards the locked configuration In an exemplary embodiment, the first biasing member is a wave spring.

Advantageously, the wave spring provides a more precise and balanced load when biasing the lock towards the locked configuration than convention compression springs.

In an exemplary embodiment, the clamp subassembly further comprises one or more pins, and the clamp member, the wave spring and the transverse extension each comprise one or more apertures adapted to receive the one or more pins therethrough.

Advantageously, the one or more pins being received within the one or more apertures stabilizes the clamp subassembly thereby ensuring that the wave spring provides a more precise and balanced load when biasing the lock towards the locked configuration than conventional compression springs.

In an exemplary embodiment, the lock further comprises a biasing arrangement having a second biasing member that abuts the transverse extension, urging the transverse extension against the clamp subassembly.

In an exemplary embodiment, the lock further comprises an adjustment screw for adjusting the degree of compression in the second biasing member.

Advantageously, the biasing arrangement helps to gently push the locking arm towards the locked position when it is in the unlocked position, thereby providing a degree of pre-tension to the locking arm.

Advantageously, the degree of compression in the second biasing member can be efficiently and accurately adjusted using the adjustment screw.

In an exemplary embodiment, the second biasing member is a compression spring.

In an exemplary embodiment, the biasing arrangement is adapted to maintain the cam follower portion in abutment with the cam portion when the locking arm is in the unlocked position.

Advantageously, the biasing arrangement ensures that there is a constant load applied to the cam portion as the locking arm is rotated between the locked position and the unlocked position.

In an exemplary embodiment, the body comprises an internal cavity to receive the movable locking pin and the biasing arrangement.

Advantageously, the locking pin and biasing arrangement are housed within the body such that any possibility of inadvertently disturbing the locking pin and biasing arrangement during use, for example, is reduced.

In an exemplary embodiment, the lock further comprises a locking arm rotatably mounted to the body and having a cam portion, and the transverse extension comprises a cam follower portion, the cam portion applying a force to the cam follower portion of the transverse extension, causing the locking pin to move to the locked position when the lock is in the locked configuration.

In an exemplary embodiment, the locking pin adjacent to the transverse extension comprises rack teeth and the cam portion comprises complementary pinion teeth for meshing with the rack teeth.

Advantageously, the meshing of the pinion teeth with the rack teeth allows the cam portion to grip the locking pin when moving the locking pin to the released position.

In an exemplary embodiment, the lock further comprises a compression spring arrangement having a compression spring that abuts the transverse extension, urging the transverse extension against the cam portion, and, at a remote end, an adjustment screw for adjusting the degree of compression in the compression spring.

In an exemplary embodiment, the compression spring arrangement is adapted to allow movement of the locking pin to accommodate changes in distance between an instantaneous center of rotation of the cam portion and the transverse extension during rotation of the locking arm.

In an exemplary embodiment, the compression spring arrangement is adapted to maintain the locking pin in the locked position when the lock is in the locked configuration through application of a reaction force to the transverse extension.

In an exemplary embodiment, the adjustment screw has an external thread and the body has a complementary internal thread adapted to meshingly receive the external thread of the adjustment screw such that the axial position of the adjustment screw can be accurately adjusted relative to the body.

Advantageously, the degree of compression in the compression spring can be efficiently and accurately adjusted using the adjustment screw.

In an exemplary embodiment, the body comprises an internal cavity to receive the movable locking pin and the compression spring arrangement.

Advantageously, the locking pin and compression spring arrangement are housed within the body such that any possibility of inadvertently disturbing the locking pin and compression spring arrangement during use, for example, is reduced.

In an exemplary embodiment, the body comprises a recess to receive the locking arm.

Advantageously, the locking arm is flush with the body of the combination square when the lock is in the locked configuration thus reducing the possibility of inadvertently putting the lock in the released configuration.

In an exemplary embodiment, the locking arm comprises a lever portion disposed distal to the cam portion.

Advantageously, the lock can be put in the locked configuration by applying a direct clockwise moment to the lever portion of the locking arm and the lock can be put in the released configuration by applying a direct anti-clockwise moment to the lever portion.

Advantageously, a user can fix the blade at a selected position relative to the body of the combination square with a first hand and using the second hand, grip the body of the combination square while putting the lock in the locked configuration by applying a clockwise moment to the lever portion of the locking arm. Alternately, a user can put the lock in the released configuration by applying an anticlockwise moment to the lever portion of the locking arm with the second hand and then adjust the position of the blade relative to the body of the combination square using the first hand.

Advantageously, the clockwise moment applied to the lever portion of the locking arm is transmitted into a lateral clamping force on the blade.

In an exemplary embodiment, the blade has one or more blade scales.

In an exemplary embodiment, the body has one or more body scales.

Advantageously, the blade and body scales provide reference points when the combination square is used as a measuring or marking device on a work piece.

Advantageously, the length of the blade may be sized so as to be useful in a variety of situations.

Advantageously, the blade and body of the combination square can be manufactured from any suitable engineering material so as to be useful in a variety of situations. For example, where rusting is a concern, the combination square may be made of a suitable metal, for example, stainless steel, aluminum, brass, or a suitable polymer or ceramic; where weight is a concern, the blade may be manufactured from aluminum or any suitable engineering polymer.

Advantageously, the combination square is simple, user friendly and economical in cost to manufacture.

In an exemplary embodiment, the combination square further comprises a scribe guide adapted to locate on the blade, the scribe guide having a scribe aperture for receiving a scribe in use.

Advantageously, the scribe guide locates at the tip of the blade and provides measures to make marks or lines along a work piece while moving the combination square along an edge of the work piece.

According to a second aspect of the present invention, there is provided a combination square, comprising:
   a blade;
   a body comprising a slot adapted to receive the blade therein and permit sliding translation of the blade parallel to the longitudinal axis of the blade, allowing the position of the blade to be adjusted relative to the body;
   a lock for releasably locking the position of the blade relative to the body; and
   a removable extension bracket being wider than and removable from the body and comprising one or more working surfaces.

Advantageously, the removable extension bracket allows the combination square to be used in situations where a work piece has a radiused or otherwise irregular surface. The removable extension bracket may be of any suitable width, making it simple to use when the guiding surface of a work piece is not at perfect right angles to the working surface of the work piece on which markings or cuts are to be made. For example, the combination square may be used without rocking or slipping where there is limited amount of contact between the working surface and the work piece at irregular surfaces such as fillets or chamfers.

Preferably, the body is adapted to slidingly receive the removable extension bracket.

Preferably, the removable extension bracket is slidingly received on the body perpendicular to the blade.

Advantageously, the removable extension bracket can be easily and swiftly installed on or removed from the body of the combination square through sliding engagement.

In an exemplary embodiment, the removable extension bracket comprises a slot adapted to receive the blade therein and permit sliding translation of the blade parallel to the longitudinal axis of the blade, allowing the position of the blade relative to the removable extension bracket to be adjusted.

Advantageously, the slot in the removable extension bracket is dimensionally consistent with the slot in the body such that the accuracy of the combination square is maintained.

In an exemplary embodiment, the removable extension bracket further comprises one or more locating guides and the body further comprises one or more locating dimples, each locating dimple being adapted to receive one of the one or more locating guides therein for positively locating the removable extension bracket at a selected position along the body.

Advantageously, the removable extension bracket can be positively located on the body of the combination square each time it is mounted on the selected position of the body.

Advantageously, each of the one or more locating guides fits snugly within the corresponding locating dimple on the body of the combination square to produce a secure fitting.

In an exemplary embodiment, the one or more locating guides each comprise an engaging member and a compression spring that abuts the engaging member, urging the engaging member against the corresponding locating dimple on the body.

Advantageously, each engaging member is urged against the corresponding locating dimple thereby providing a degree of resistance to prevent the removable extension bracket from undesirably sliding along the body of the combination square in use.

In an exemplary embodiment, the one or more locating guides each further comprise, at a remote end, an adjustment screw for adjusting the degree of compression in the compression spring.

In an exemplary embodiment, the adjustment screw has an external thread and the removable extension bracket has a complementary internal thread adapted to meshingly receive the external thread of the adjustment screw, such that the axial position of the adjustment screw can be accurately adjusted relative to the removable extension bracket.

Advantageously, the degree of compression in the compression spring can be efficiently and accurately adjusted using the adjustment screw. This is beneficial in situations where a user requires a greater degree of resistance to prevent the removable extension bracket from undesirably sliding along the body of the combination square in use.

Advantageously, as the spring force of the compression springs deteriorates over time, the degree of compression can be adjusted using the adjustment screw, thereby prolonging the lifetime of the compression spring arrangement in the removable extension bracket.

Advantageously, the compression springs and the one or more locating guides can be easily removed and replaced if required.

In an exemplary embodiment, the removable extension bracket further comprises a stopper adapted to prevent the removable extension bracket from applying a substantial force on the blade in use.

Advantageously, the stopper prevents the blade and/or the slot from becoming damaged over time by repeated removal and mounting of the removable extension bracket on the body which could comprise the accuracy of the combination square.

In an exemplary embodiment, the removable extension bracket has one or more bracket scales.

Advantageously, the bracket scales provide reference points when the combination square fitted with the removable extension bracket is used as a measuring or marking device in situations where a work piece has a radiused or otherwise irregular surface.

Advantageously, the removable extension bracket may be of any suitable length.

According to a third aspect of the present invention, there is provided combination square, comprising:
- a blade;
- a body comprising a slot adapted to receive the blade therein and permit sliding translation of the blade parallel to the longitudinal axis of the blade, allowing the position of the blade to be adjusted relative to the body; and
- a lock module attachable to the body and comprising a lock, the lock adapted to lock the position of the blade relative to the body in a locked configuration and to allow adjustment of the position of the blade relative to the body in a released configuration.

Advantageously, the lock module can be removed from the body for the purposes of, for example, maintenance or repair.

Advantageously, the lock allows simple, quick and efficient locking and adjustment of the position of the blade relative to the body.

Advantageously, the body and lock are sized, shaped and relatively disposed to enable easy and swift operation with, for example, one hand.

Advantageously, the location of the lock in a generally medial position of the body allows the combination square to be operable by either left handed or right handed users.

Advantageously, the lock achieves reliable and secure releasable locking of the blade relative to the body to provide a combination square with a sturdy locking mechanism.

In an exemplary embodiment, the lock module comprises a locking pin, the locking pin moveable in the lock module in a direction generally parallel to the longitudinal axis of the body, between a locked position where the lock is in the locked configuration and a released position where the lock is in the released configuration.

In an exemplary embodiment, the blade comprises a longitudinal groove formed therein, and the locking pin comprises a protrusion at an engagement end thereof, the protrusion being adapted to engage with and slide in the groove.

In an exemplary embodiment, the groove is generally dovetailed in cross-section and the protrusion is complementary in cross-section such that the protrusion is held within the groove.

Advantageously, the dovetailed cross-sections of the groove and the protrusion provide the blade with a desirable one degree of freedom when the lock is in the released configuration. This allows the blade to slide predictably within the slot of the body when the lock is in the released configuration.

Advantageously, the protrusion can be released from the groove at either ends of the blade allowing the blade to be removable from the body. This allows one or more additional blades to be interchangeably used with the combination square.

In an exemplary embodiment, the locking pin exerts a lateral clamping force on the blade via the protrusion when the locking pin is in the locked position, and no clamping force when the locking pin is in the released position.

In an exemplary embodiment, the locking pin further comprises a transverse extension.

In an exemplary embodiment, the lock module further comprises a locking arm rotatably mounted to the lock module and movable between a locked position, in which the lock is in the locked configuration, and an unlocked position, in which the lock is in the released configuration, and having a cam portion, and a clamp subassembly adapted to locate between the cam portion and the transverse extension, the clamp subassembly comprising a clamp member having a cam follower portion, the cam portion applying a force to the cam follower portion of the clamp member, causing the locking pin to be held in the locked position and thus when the locking arm is in the locked position the lock is maintained in the locked configuration until the locking arm is moved towards the unlocked position.

Advantageously, the lock can be easily switched between the locked configuration and the released configuration using the locking arm while the combination square is in use.

Advantageously, the force applied by the cam portion is sufficient to maintain the lock in the locked configuration.

In an exemplary embodiment, the clamp subassembly further comprises a first biasing member located between the clamp member and the transverse extension.

Advantageously, the first biasing member biases the lock towards the locked configuration.

In an exemplary embodiment, the first biasing member is a wave spring.

Advantageously, the wave spring provides a more precise and balanced load when biasing the lock towards the locked configuration than a conventional compression spring.

In an exemplary embodiment, the clamp subassembly further comprises one or more pins, and the clamp member, the wave spring and the transverse extension each comprise one or more apertures adapted to receive the one or more pins therethrough.

Advantageously, the one or more pins being received within the one or more apertures stabilizes the clamp subassembly thereby ensuring that the wave spring provides a more precise and balanced load when biasing the lock towards the locked configuration than conventional compression springs.

In an exemplary embodiment, the lock further comprises a biasing arrangement having a second biasing member that abuts the transverse extension, urging the transverse extension against the clamp subassembly, and, at a remote end, an adjustment screw for adjusting the degree of compression in the second biasing member.

Advantageously, the biasing arrangement helps to gently push the locking arm towards the locked position when it is in the unlocked position, thereby providing a degree of pre-tension to the locking arm.

Advantageously, the degree of compression in the second biasing member can be efficiently and accurately adjusted using the adjustment screw.

In an exemplary embodiment, the second biasing member is a compression spring.

In an exemplary embodiment, the biasing arrangement is adapted to allow movement of the locking pin to accommodate changes in distance between the cam portion and the clamp subassembly during rotation of the locking arm.

Advantageously, the biasing arrangement ensures that there is a constant load applied to the cam portion as the locking arm is rotated between the locked position and the unlocked position.

In an exemplary embodiment, the adjustment screw has an external thread and the lock module has a complementary internal thread adapted to meshingly receive the external thread of the adjustment screw, such that the axial position of the adjustment screw can be accurately adjusted relative to the lock module.

In an exemplary embodiment, the lock module comprises an internal cavity to receive the movable locking pin and the biasing arrangement.

Advantageously, the locking pin and biasing arrangement are housed within the body such that any possibility of inadvertently disturbing the locking pin and biasing arrangement during use, for example, is reduced.

In an exemplary embodiment, the lock module comprises a recess to receive the locking arm.

Advantageously, the locking arm is flush with the lock module when the lock is in the locked configuration thus reducing the possibility of inadvertently putting the lock in the released configuration.

Advantageously, the locking arm is flush with the body of the combination square when the lock is in the locked configuration thus reducing the possibility of inadvertently putting the lock in the released configuration.

In an exemplary embodiment, the locking arm comprises a lever portion disposed distal to the cam portion.

Advantageously, the lock can be put in the locked configuration by applying a direct clockwise moment to the lever portion of the locking arm and the lock can be put in the released configuration by applying a direct anti-clockwise moment to the lever portion.

Advantageously, a user can fix the blade at a selected position relative to the body of the combination square with a first hand and using the second hand, grip the body of the combination square while putting the lock in the locked configuration by applying a clockwise moment to the lever portion of the locking arm. Alternately, a user can put the lock in the released configuration by applying an anticlockwise moment to the lever portion of the locking arm with the second hand and then adjust the position of the blade relative to the body of the combination square using the first hand.

Advantageously, the clockwise moment applied to the lever portion of the locking arm is transmitted into a lateral clamping force on the blade.

In an exemplary embodiment, the blade has one or more blade scales.

In an exemplary embodiment, the body has one or more body scales.

In an exemplary embodiment, the combination square further comprises a scribe guide adapted to locate on the blade, the scribe guide having a scribe aperture for receiving a scribe in use.

Advantageously, the scribe guide locates at the tip of the blade and provides measures to make marks or lines along a work piece while moving the combination square along an edge of the work piece.

According to a fourth aspect of the present invention, there is provided a combination square, comprising:
a blade;
a body comprising a slot adapted to receive the blade therein and permit sliding translation of the blade parallel to the longitudinal axis of the blade, allowing the position of the blade to be adjusted relative to the body;
a lock module attachable to the body and comprising a lock, the lock adapted for releasably locking the position of the blade relative to the body; and
a removable extension bracket being wider than and removable from the body and comprising one or more working surfaces.

Advantageously, the removable extension bracket allows the combination square to be used in situations where a work piece has a radiused or otherwise irregular surface. The removable extension bracket may be of any suitable width, making it simple to use when the guiding surface of a work piece is not at perfect right angles to the working surface of the work piece on which markings or cuts are to be made. For example, the combination square may be used without rocking or slipping where there is limited amount of contact between the working surface and the work piece at irregular surfaces such as fillets or chamfers.

In an exemplary embodiment, the body is adapted to slidingly receive the removable extension bracket.

In an exemplary embodiment, the removable extension bracket is slidingly received on the body perpendicular to the blade.

Advantageously, the removable extension bracket can be easily and swiftly installed on or removed from the body of the combination square through sliding engagement.

In an exemplary embodiment, the removable extension bracket comprises a slot adapted to receive the blade therein and permit sliding translation of the blade parallel to the longitudinal axis of the blade, allowing the position of the blade relative to the removable extension bracket to be adjusted.

Advantageously, the slot in the removable extension bracket is dimensionally consistent with the slot in the body such that the accuracy of the combination square is maintained.

In an exemplary embodiment, the removable extension bracket further comprises one or more locating guides and the body further comprises one or more locating dimples, each locating dimple being adapted to receive one of the one or more locating guides therein for positively locating the removable extension bracket at a selected position along the body.

Advantageously, the removable extension bracket can be positively located on the body of the combination square each time it is mounted at the selected position of the body.

Advantageously, each of the one or more locating guides fits snugly within the corresponding locating dimple at the selected position of the body of the combination square to produce a secure fitting.

In an exemplary embodiment, the one or more locating guides each comprise an engaging member and a compression spring that abuts the engaging member, urging the engaging member against the corresponding locating dimple on the body.

In an exemplary embodiment, the one or more locating guides further comprises, at a remote end, an adjustment screw for adjusting the degree of compression in the compression spring.

Advantageously, the one or more locating guides are urged against the corresponding locating dimples thereby providing a degree of resistance to prevent the removable extension bracket from undesirably sliding off the body of the combination square in use.

In an exemplary embodiment, the one or more locating guides each further comprise, at a remote end, an adjustment screw for adjusting the degree of compression in the compression spring.

In an exemplary embodiment, the adjustment screw has an external thread and the removable extension bracket has a complementary internal thread adapted to meshingly receive the external thread of the adjustment screw, such that the axial position of the adjustment screw can be accurately adjusted relative to the removable extension bracket.

Advantageously, the degree of compression in the compression spring can be efficiently and accurately adjusted using the adjustment screw. This is beneficial in situations where a user requires a greater degree of resistance to prevent the removable extension bracket from undesirably sliding off the body of the combination square in use.

Advantageously, as the spring force of the compression springs deteriorates over time, the degree of compression can be adjusted using the adjustment screw, thereby prolonging the lifetime of the compression spring arrangement in the removable extension bracket.

Advantageously, the compression springs and the one or more locating guides can be easily removed and replaced if required.

In an exemplary embodiment, the removable extension bracket further comprises a stopper adapted to prevent the removable extension bracket from applying a substantial force on the blade in use.

Advantageously, the stopper prevents the blade and/or the slot from becoming damaged over time by repeated removal and mounting of the removable extension bracket on the body which could compromise the accuracy of the combination square.

In an exemplary embodiment, the removable extension bracket has one or more bracket scales.

Although the invention is illustrated and described herein as embodied in a combination square, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Additional advantages and other features characteristic of the present invention will be set forth in the detailed description that follows and may be apparent from the detailed description or may be learned by practice of exemplary embodiments of the invention. Still other advantages of the invention may be realized by any of the instrumentalities, methods, or combinations particularly pointed out in the claims.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the present invention. Advantages of embodiments of the present invention will be apparent from the following detailed description of the exemplary embodiments thereof, which description should be considered in conjunction with the accompanying drawings in which.

DETAILED DESCRIPTION OF THE INVENTION

Figure 1:
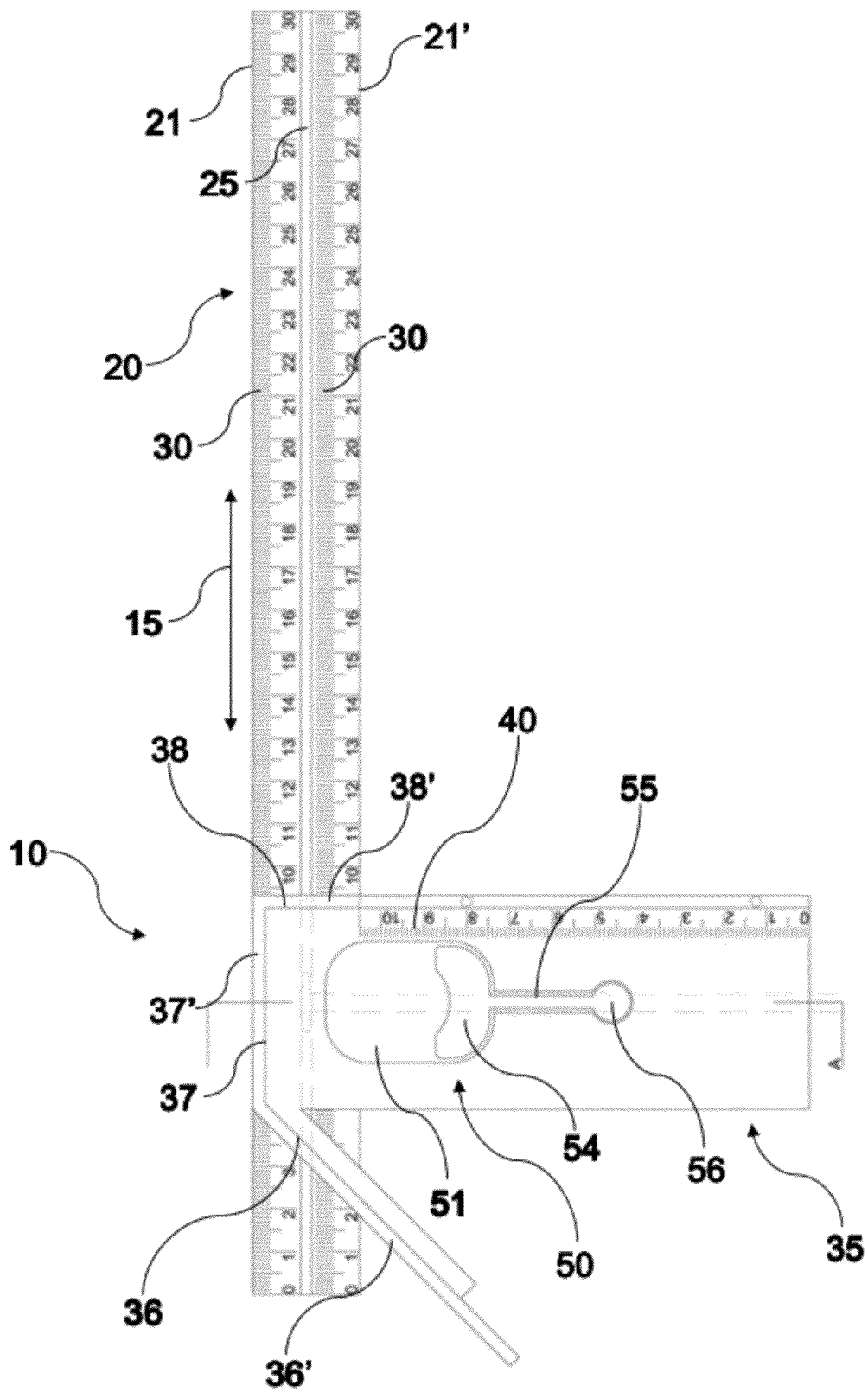
FIG. 1 is a plan view of a combination square in accordance with an exemplary embodiment of the present invention.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

Relational terms such as first and second, top and bottom, and the like may be used solely to distinguish one entity or action from another entity or action without necessarily requiring or implying any actual such relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

Herein various embodiments of the present invention are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Described now are exemplary embodiments of the present invention. Referring now to the figures of the drawings in detail and first, particularly to FIGS. 1 to 3, there is shown a first exemplary embodiment of a combination square 10 of the present invention comprising a blade 20; a body, generally indicated by the numeral 35, comprising a slot 60 adapted to receive the blade 20 therein and permit sliding translation of the blade 20 parallel to the longitudinal axis of the blade 20, as indicated by the double arrow 15, allowing the longitudinal position of the blade 20 to be adjusted relative to the body 35; and a lock 50 adapted to lock the position of the blade 20 relative to the body 35 in a locked configuration and to allow adjustment of the position of the blade 20 relative to the body 35 in a released configuration The blade 20 has a plurality of straight-edges, designated in FIG. 1 as straight-edges 21 and 21'. The blade 20 may include one or more blade scales 30 disposed along at least one of the straight-edges (21, 21') of the blade 20. The one or more blade scales 30 are typically disposed along at least one of the straight-edges (21, 21') of the blade 20.

The blade 20 comprises a longitudinal groove 25 formed in one face of, and along the length of the blade 20. The groove 25 may extend partially or fully along the length of the blade 20. In an exemplary embodiment, the groove 25 extends along the full length of the blade 20 such that the blade 20 may be removable from the body 35. It will be appreciated by persons skilled in the art, therefore, that one or more additional blades 20, marked with, for example, alternative blade scales 30, may be interchangeably used.

In an exemplary embodiment, the slot 60 in the body 35 is adapted to receive the blade 20 completely therein, such that straight-edge 21 of the blade 20 is generally aligned with the straight-edge surface 37 of the body 35. It will be appreciated by persons skilled in the art that in other embodiments, the blade 20 may be just partially received in the slot 60.

Figure 2:
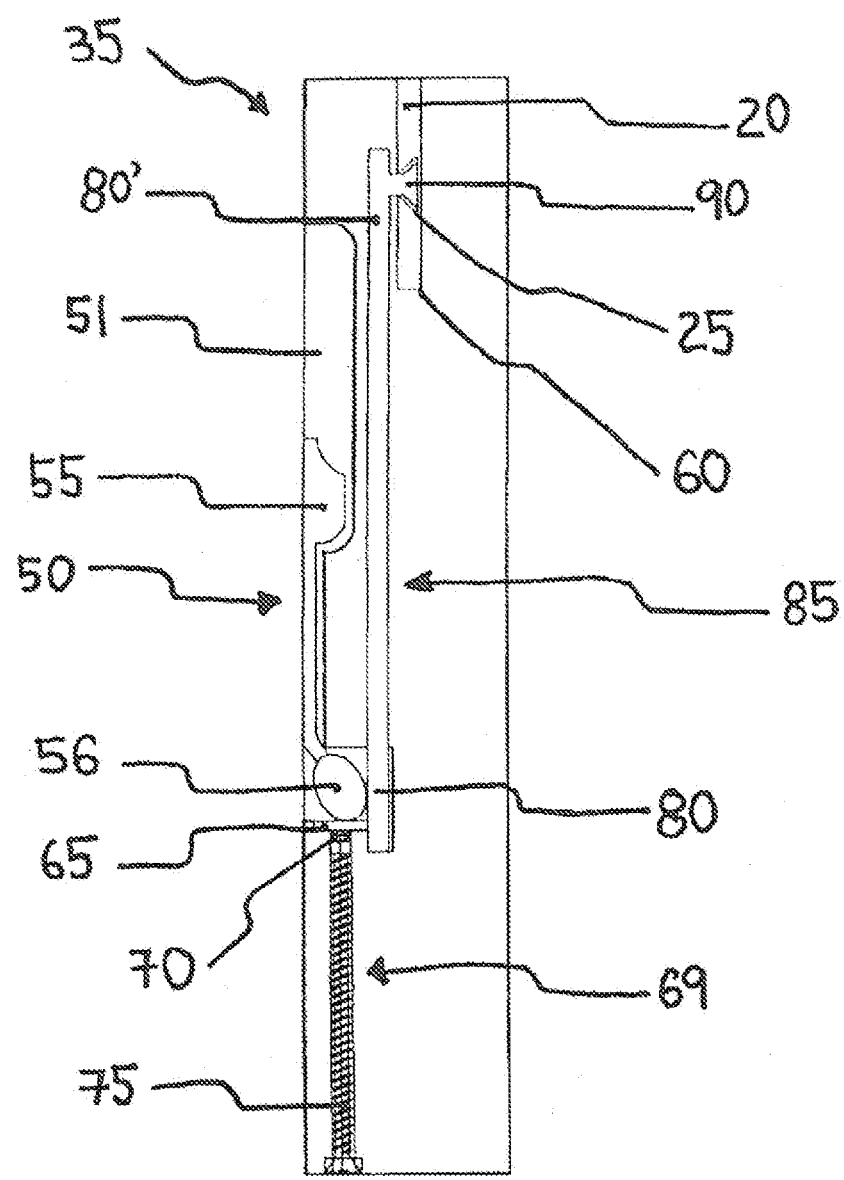
FIG. 2 is a cross-sectional side view of a body of the combination square taken along A-A in FIG. 1.

As shown in FIG. 1, the body 35 of the combination square 10 may comprise a plurality of straight-edges, designated as 36, 37 and 38. The one or more of the straight-edges 36, 37 and 38 may be marked with one or more body scales 40. Straight-edges 36, 37 and 38 are suitable for setting, marking or checking, for example, right angles when the body 35 of the combination square 10 is placed against a work piece (not shown). Straight-edges 36 and 37 form a 45° angle, while straight-edges 37 and 38 form a 90° angle. However, it will be appreciated by persons skilled in the art that the angle between straight-edges 36 and 37 is not limited to a 45° angle, and that other angles are possible within the scope of the present invention. The straight-edges 36, 37 and 38 have guide flanges 36', 37' and 38' are disposed on respective straight-edges 36, 37 and 38 perpendicularly thereto for increasing the surface area in contact with a work piece (not shown). The guide flanges 36', 37' and 38' will be of sufficient width to enable a user to stably hold the straight-edges (36, 37, 38) of the combination square 10 against a surface of a work piece (not shown) to form an exact right angle with the work piece surface. As best shown in FIG. 2, slot 60 is adapted to receive the blade 20 therein and permit sliding translation of the blade 20 parallel to the longitudinal axis of the blade 20.

In an exemplary embodiment, the lock 50 has a locked configuration where the longitudinal position of the blade 20 relative to the body 35 is locked and a released configuration where the position of the blade 20 relative to the body 35 is adjustable. The lock 50 is located in a generally medial position in the body 35, as shown in FIG. 1, to enable easy and swift operation, for example, with one hand. However, it will be appreciated by persons skilled in the art that the lock 50 may be located in any suitable position in the body 35 within the scope of the present invention.

Referring to FIG. 2, the lock 50 comprises a locking pin 85 having an engagement end 80' and a remote end 80, wherein the locking pin 85 is moveable in the body 35 in a direction generally parallel to the longitudinal axis of the body 35, between a locked position where the lock 50 is in the locked configuration and a released position where the lock 50 is in the released configuration.

In an exemplary embodiment, the locking pin 85 comprises a protrusion 90 at the engagement end 80' that engages with and slides in the longitudinal groove 25 of the blade 20. Therefore, in use, when the lock 50 is in the locked configuration, the locking pin 85 exerts a lateral clamping force on the blade 20 via the protrusion 90, substantially pulling the blade 20 down into the slot 60. Alternately, when the lock 50 is in the released configuration, the locking pin 85 is in the released position such that no clamping force is applied on the blade 20 via the protrusion 90, such that the blade 20 may be adjusted within the slot 60 of the body 35 as required. The groove 25 and protrusion 90 are generally dovetailed in cross-section, as shown in FIG. 2. However, it will be appreciated by persons skilled in the art that the cross-section of the groove 25 and protrusion 90 is not limited to a dovetailed cross-section and that any suitable cross-section is possible within the scope of the present invention.

The locking pin 85 comprises a transverse extension 65 which extends from the remote end 80 of the locking pin 85. The transverse extension 65 extends from the remote end 80 of the locking pin 85 in a direction substantially opposite to that of the protrusion 90.

Figure 3:
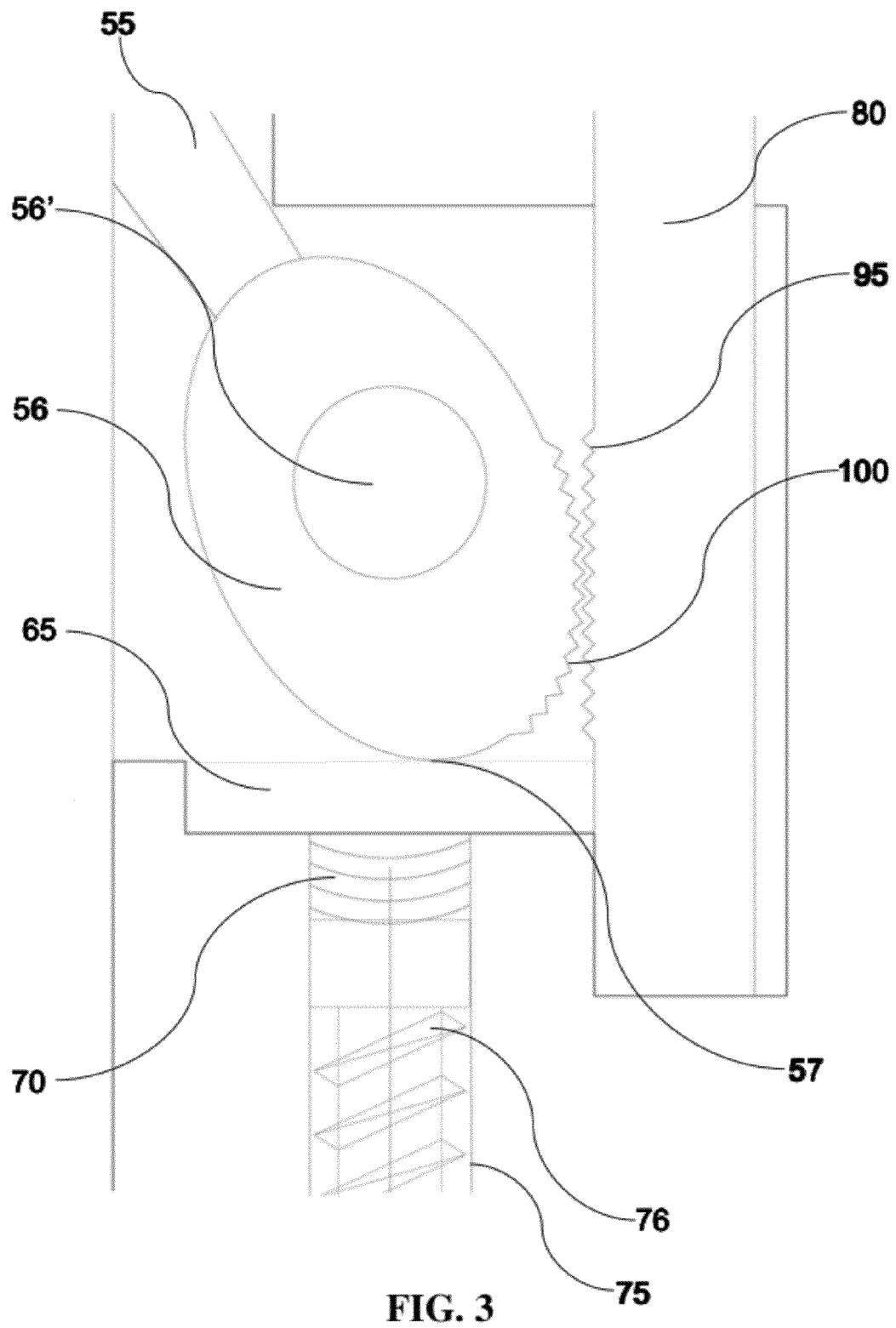
FIG. 3 is a fragmentary, cross-sectional side view of a lock used in the combination square taken along A-A in FIG. 1.

The lock 50 further comprises a locking arm 55 that is rotatably mounted to the body 35 of the combination square 10 and has a cam portion 56. The cam portion 56 is disposed at a remote end of the locking arm 55. The locking arm 55 and cam portion 56 share a common instantaneous center of rotation 56' about which the locking arm 55 rotates. The transverse extension 65 comprises a cam follower portion 57 that is adapted to follow the profile of the cam portion 56. In use, when the locking arm 55 is rotated in an anti-clockwise direction, the cam portion 56 applies a force to the cam follower portion 57 of the transverse extension 65 of the locking pin 85 causing the locking pin 85 to move to the locked position, thereby placing the lock 50 in the locked configuration, and locking the position of the blade 20 relative to the body 35. As shown in FIG. 3, the length of the transverse extension 65 is sufficient to allow the cam portion 56 to apply a force to the cam follower portion 57 of the transverse extension 65, as defined within the scope of the present invention.

In an exemplary embodiment, the locking pin 85 adjacent to the transverse extension 65 comprises rack teeth 95 for meshing with complementary teeth, hereafter referred to as pinion teeth 100, on the cam portion 56. The locking arm 55 further comprises a lever portion 54 disposed distal to the cam portion 56.

The lock 50 further comprises a compression spring arrangement 69 that abuts the transverse extension 65, urging the transverse extension 65 against the cam portion 56, and, at a remote end, an adjustment screw 75 for adjusting the degree of compression in the compression spring arrangement 69. The adjustment screw 75 has an external thread 76 and the body 35 has a complementary internal thread (not shown) adapted to meshingly receive the external thread 76 of the adjustment screw 75 such that the axial position of the adjustment screw 75 can be accurately adjusted relative to the body 35.

The body 35 further comprises an internal cavity (not shown) to receive the movable locking pin 85 and compression spring arrangement 69. The body 35 also comprises a recess 51 to receive the locking arm 55 when the lock 50 is in the locked configuration.

Referring to FIG. 1, the one or more blade scales 30 on the blade 20 provide reference points when the blade 20 is used as a rule member for measuring or marking, for example, a work piece (not shown). It will be appreciated by persons skilled in the art that the blade scales 30 on the blade 20 may take the form of any one of a number of marking or measuring scales, including but not limited to any one or more of the following: the International System of Units; and Imperial Units.

Referring to FIG. 2, in an exemplary embodiment, the slot 60 and lock 50 work in juxtaposition with each other to allow the position of the blade 20 to be adjusted relative to the body 35. For example, when the lock 50 is in the locked configuration, the position of the blade 20 relative to the body 35 is locked, and when the lock 35 is in the released configuration the position of the blade 20 relative to the body 35 is adjustable. As shown in the figure, the lock 50 comprises a locking pin 85 which is moveable in the body 35 in a direction generally parallel to the longitudinal axis of the body 35 between the released position when the lock 50 is in the released configuration and the locked position when the lock 50 is in the locked configuration.

In an exemplary embodiment, the movement of the locking pin 85 between the locked position and released position may be achieved by applying an input torque or moment to the lever portion 54 of the locking arm 55, which is rotatable about the instantaneous center 56' of rotation. For example, applying a clockwise moment to the lever portion 54 will cause the locking arm 55 to rotate about the instantaneous center 56' of rotation thereby placing the lock 50 in the locked configuration. In this configuration, the cam portion 56 applies a force on the cam follower portion 57 of the transverse extension 65 of the locking pin 85 causing the locking pin 85 to move to the locked position. The cam portion 56 has a generally elliptical cam profile having a major and a minor axis as shown in FIG. 3, such that the cam portion 56 abuts cam follower portion 57 of the transverse extension 65 at a point on the cam profile that is on the major axis of the cam portion 56. Due to the generally elliptical nature of the cam profile, when a clockwise moment is applied to the lever portion 54 of the locking arm 55, the arm 55 rotates about the instantaneous center 56' of rotation, the major axis of the cam portion 56 acts as a lever causing a force to be applied to the cam follower portion 57 of the transverse extension 65 of the locking pin 85, which, in turn, causes the locking pin 85 to move to the locked position. Alternately, an anti-clockwise moment applied to the lever portion 54 will cause the locking arm 55 to rotate about the instantaneous center 56' of rotation thereby placing the lock 50 in the released configuration. In this configuration, the cam portion 56 applies a force on the locking pin 85 causing the locking pin 85 to move to the released position. In the preferred embodiment, the cam portion 56 applies a force on the locking pin 85 adjacent to the transverse extension 65.

The force on the locking pin 85 adjacent the transverse extension 65 may be enhanced by modifying the complementary surfaces of the cam portion 56 and the locking pin 85 to provide grip or friction. In an exemplary embodiment, the force on the locking pin 85 may be enhanced by modifying the locking pin 85 adjacent the transverse extension 65 with rack teeth 95 and modifying the surface of the cam portion 56 with complementary pinion teeth 100 for meshing with the rack teeth 95. The meshing of the pinion teeth 100 with the rack teeth 95 generates the additional grip/friction required for enhancing the force applied by the cam portion 56 on the locking pin 85 adjacent the transverse extension 65 to move the locking pin 85 to the released position. It will be appreciated by persons skilled in the art that other measures for generating or enhancing the grip/friction between the locking pin 85 and the cam portion 56. For example, the complementary surfaces of the cam portion 56 and the locking pin 85 adjacent the transverse extension 65 may be roughened, or may be modified to provide a peg gear arrangement.

The compression spring arrangement 69 is adapted to allow movement of the locking pin 85 to accommodate changes in distance between the instantaneous center 56' of rotation of the cam portion 56 and the transverse extension 65 during rotation of the locking arm 55.

In an exemplary embodiment, the compression spring arrangement 69 is adapted to maintain the locking pin 85 in the locked position when the lock 50 is in the locked configuration through application of a reaction force to the transverse extension 65, which, in turn, applies a force on the cam portion 56 of the locking arm 55 that acts to overcome the tendency of the locking arm 55 to rotate in an anticlockwise direction due to the reaction force of the compression spring arrangement 69 urging against the transverse extension 65. It will be appreciated by persons skilled in the art that the amount of compression in the compression spring 70 will be greater when the lock 50 is in the locked configuration than when the lock 50 is in the released configuration. The degree of compression in the compression spring 70 may be accurately adjusted by varying the position of the adjustment screw 75 relative to the body 35 of the combination square 10. The adjustment screw 75 has an external thread 76 which can be meshed with a complementary internal thread (not shown) within the body 35 to allow the position of the adjustment screw 75 to be accurately adjusted relative to the body 35. It will be appreciated by persons skilled in the art that fine adjustment of the degree of compression in the compression spring 70 may be achieved by any one of a number of suitable measures including but not limited to, for example, an adjustment device or means and body 35 having complementary bayonet fittings.

When the lock 50 is in the locked configuration, the locking arm 55 lies within the recess 51 in the body 35 of the combination square 10 such that the locking arm 55 is flush with the body 35. Advantageously, this has the desirable effect of reducing the possibility of inadvertently putting the lock 50 in the released configuration.

Figure 8:
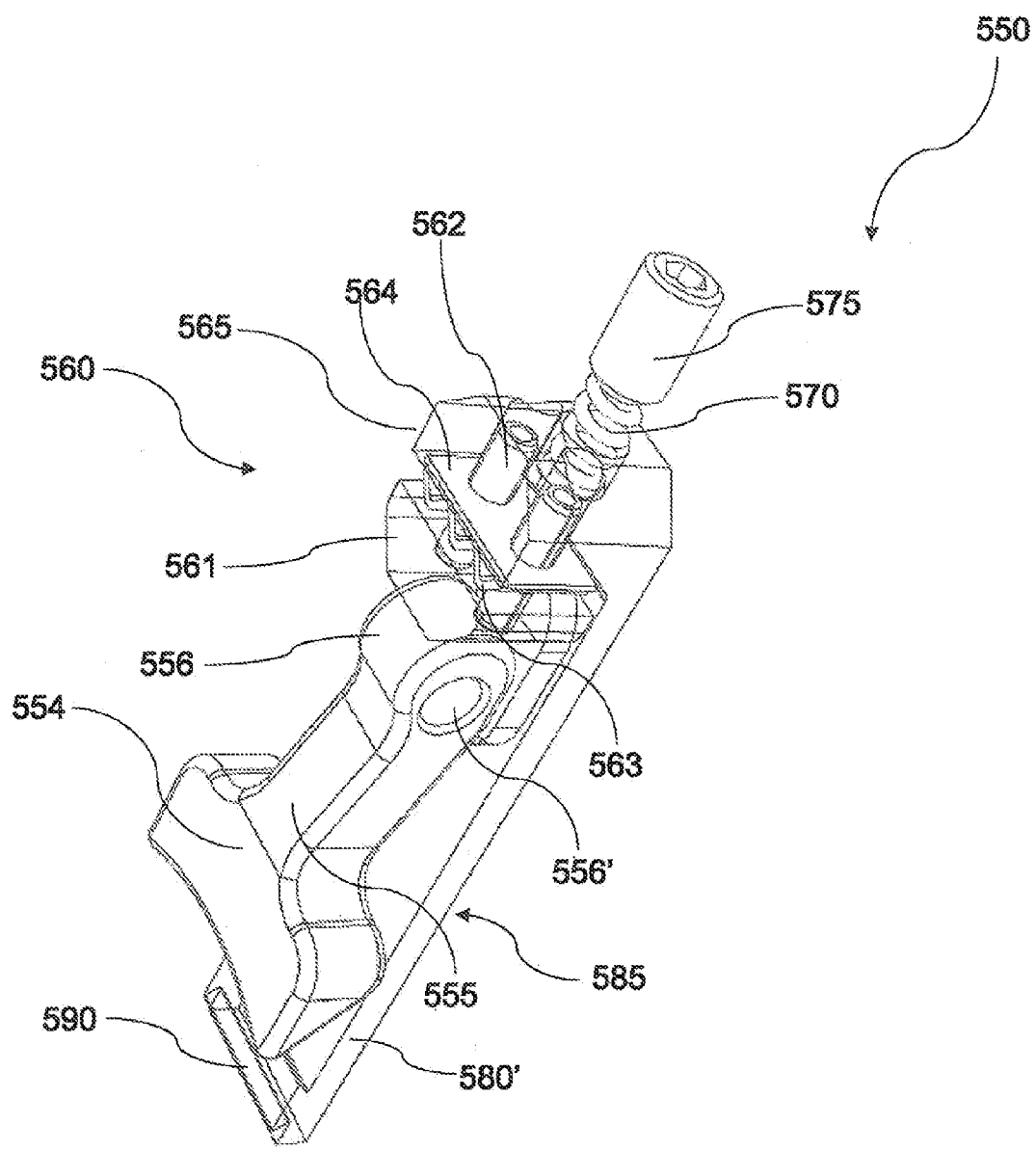
FIG. 8 is a partially transparent perspective view of a lock used in the combination square of FIG. 1.

In an exemplary embodiment, the longitudinal groove 25 and the protrusion 90 are generally dovetailed in cross-section, as shown in FIG. 2. The dovetailed cross-sections of the groove 25 and the protrusion 90 provide the blade 20 with a desirable one degree of freedom when the lock is in the released configuration. This allows the blade 20 to slide predictably within the slot 60 of the body 35 when the lock 50 is in the released configuration. It will be appreciated by persons skilled in the art that the complementary cross-sections of the groove 25 and the protrusion 90 in the present invention are not limited to being dovetailed in shape, but rather other cross-sections, for example, semi-circular; rectangular, may be anticipated. It should be noted that the groove 25 and protrusion 90 having, for example, complementary semi-circular or rectangular cross-sections will provide the blade 20 with two degrees of freedom, which may cause the blade 20 to slide unpredictably in the slot 60 of the body 35 when the lock 50 is in the released configuration. Additionally, the dovetailed cross-sections of the groove 25 and the protrusion 90 of the exemplary embodiment have longitudinal edges that terminate in sharp points, which ensure that the position of the blade 20 relative to the body 35 in the direction normal to the blade 20 is constant when the lock 50 is in the locked configuration, since the clamping force on the blade 20 is substantially applied by the terminal point of the protrusion 90 on the terminal point of the groove 25. The accuracy of the assembly in the direction normal to the blade 20 is, therefore, pre-defined and does not need to be manually checked by the user. In another exemplary embodiment, and referring specifically to FIG. 8, lock 550 located in the body 35 of the combination square 10 comprises a locking arm 555 rotatably mounted to the body 35 and movable between the locked position, in which the lock 550 is in the locked configuration, and an unlocked position, in which the lock 550 is in the released configuration, and having a cam portion 556, and a clamp subassembly 560 adapted to locate between the cam portion 556 and the transverse extension 565, the clamp subassembly 560 comprising a clamp member 561 having a cam follower portion (not shown), the cam portion 556 applying a force to the cam follower portion when the locking arm 555 is in the locked position causing the locking pin 585 to be held in the locked position and thus to maintain the lock 550 in the locked configuration until the locking arm 555 is moved towards the unlocked position. As shown in FIG. 8, the clamp subassembly 560 further comprises a first biasing member located between the clamp member 561 and the transverse extension 565 for biasing the lock 550 towards the locked configuration. In this embodiment, the first biasing member is a wave spring 563. Wave springs 563 offer an alternative to coiled springs with specific advantages such as a reduced working height with equal deflection and equal force which is ideal for tight radial and axial spaces. However, it will be appreciated that any suitable biasing member may be employed in the clamp subassembly 560, including, but not limited to, any one of the following: a compression spring, a resilient compound such as a (treated) polymer or a (treated) rubber, for example vulcanized rubber, or a silicone based compound. The clamp subassembly 560 further comprises one or more pins 562, and the clamp member 561, the wave spring 563 and the transverse extension 565 each comprise one or more apertures adapted to receive the one or more pins 562 therethrough. In this configuration, the one or more pins 562 being received within the one or more apertures of each component of the clamp subassembly 560 stabilize the clamp subassembly 560 thereby ensuring that the wave spring 563 provides a balanced load when biasing the lock 550 towards the locked configuration. The one or more apertures in the clamp member 561 have a diameter that is slightly smaller than the outside diameter of the one or more pins 562, such that, in use, the one or more pins 562 are tightly and securely received within the clamp member 561 (i.e., by an interference fit) thereby limiting the chance that the one or more pins 562 will become free of the clamp member 561 in use.

The cam portion 556 has a generally elliptical cam profile having a major and a minor axis, such that the cam portion 556 abuts cam follower portion (not shown) of the clamp member 561 at a point on the cam profile that is on the major axis of the cam portion 556 when the locking arm 555 is in the locked position. Due to the generally elliptical nature of the cam profile, when an anti-clockwise moment is applied to the lever portion 554 of the locking arm 555, the locking arm 555 rotates about the axis of rotation of the spindle 556', the major axis of the cam portion 556 acts as a lever causing a force to be applied to the cam follower portion, this forces clamp member 561 against the wave spring 563 which, in turn, forces the transverse extension 565 of the locking pin 585 towards the locked position, where it remains until such time as a clockwise moment is applied to the lever portion 554 to cause the locking arm 555 to move towards the unlocked position. In this situation, as force is applied to the cam follower portion on the clamp member 561, the clamp member 561 is forced towards the transverse extension 565 driving the one or more pins 562 further into the corresponding apertures in the transverse extension 565 against the bias of the wave spring 563. The wave spring 563 located between the clamp member 561 and the transverse extension 565 is subsequently forced into compression and a corresponding reaction force is produced.

The lock 550 further comprises a biasing arrangement having a second biasing member, in this case a helical compression spring 570 that abuts an underside of the transverse extension 565, urging the transverse extension 565 against the clamp subassembly 560, and, at a remote end, an adjustment screw 575 for adjusting the degree of compression in the helical spring 570. In use, the lock 550 can be easily switched between the locked configuration and the released configuration using the locking arm 555, such that the force applied by the cam portion 556 is sufficient to maintain the lock 550 in the locked configuration. The biasing arrangement helps to gently push the locking arm 555 towards the locked position when it is in the unlocked position, thereby providing a degree of pre-tension to the locking arm 555. Advantageously, the degree of compression in the helical spring 570 can be efficiently and accurately adjusted using the adjustment screw 575.

The body 35 comprises an internal cavity to receive the movable locking pin 585 and the biasing arrangement. This is beneficial as the locking pin 585 and biasing arrangement are housed within the body 35 such that any possibility of inadvertently disturbing the locking pin 585 and biasing arrangement during use, for example, is reduced.

The clamp subassembly may further comprise one or more shim spacers 564 adapted to locate between the wave spring 563 and the transverse extension 565. The shim spacers 564 may be necessary in situations where, for example, the clamp subassembly 560 has been well used and the wave spring 563 has deteriorated over time such that the load applied to the cam portion 556 has lessened. In this respect, rather than replace the wave spring 563 it may be simpler to introduce one or more shim spacers 564 into the clamp subassembly 560 to effectively narrow the distance between the transverse extension 565 and the clamp member 561 caused as a result of the deteriorated wave spring 563. In this embodiment, it will be appreciated that the one or more shim spacers 564 comprise one or more apertures adapted to receive the one or more pins 562 therethrough, such that in use, the one or more shim spacers 564 are located in series between the wave spring 563 and the transverse extension 565. In this embodiment, the one or more shim spacers 564 are manufactured from a hardened material such as, for example, hardened steel. However, it will be appreciated that other suitable engineering materials may be employed as shim spacers 564.

Figure 4:
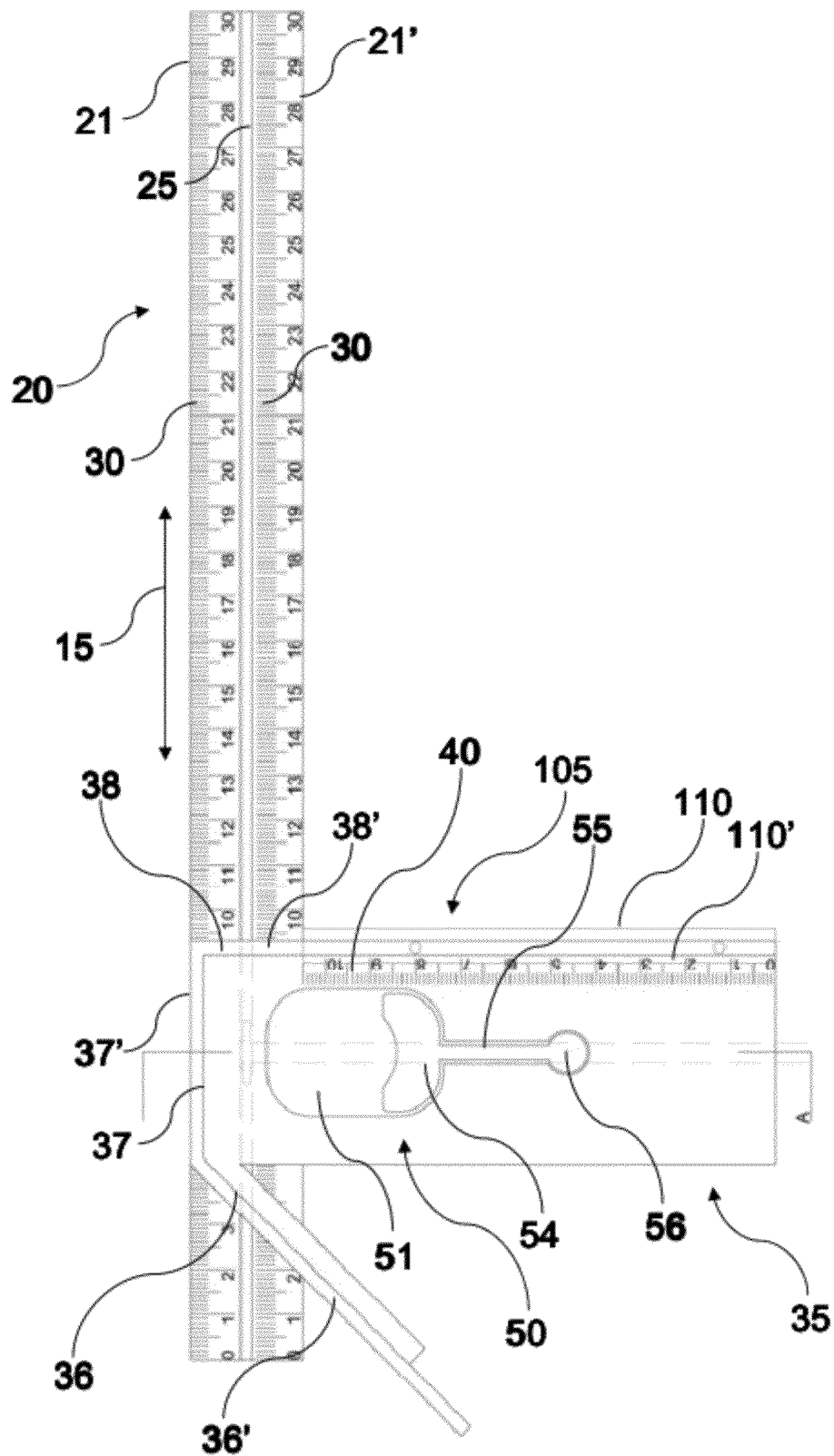
FIG. 4 is a plan view of the combination square of FIG. 1 with a removable extension bracket slidingly received on the body of the combination square.

FIG. 4 illustrates a second embodiment of the combination square 10 of the present invention, comprising: a blade 20; a body 35 comprising a slot adapted to receive the blade 20 therein and permit sliding translation of the blade 20 parallel to the longitudinal axis of the blade 20, allowing the position of the blade 20 to be adjusted relative to the body 35; a lock 50 for releasably locking the position of the blade 20 relative to the body 35; and a removable extension bracket 105 being wider than and removable from the body 35 and comprising one or more straight-edge surfaces, 110 and 110'.

Figure 5:
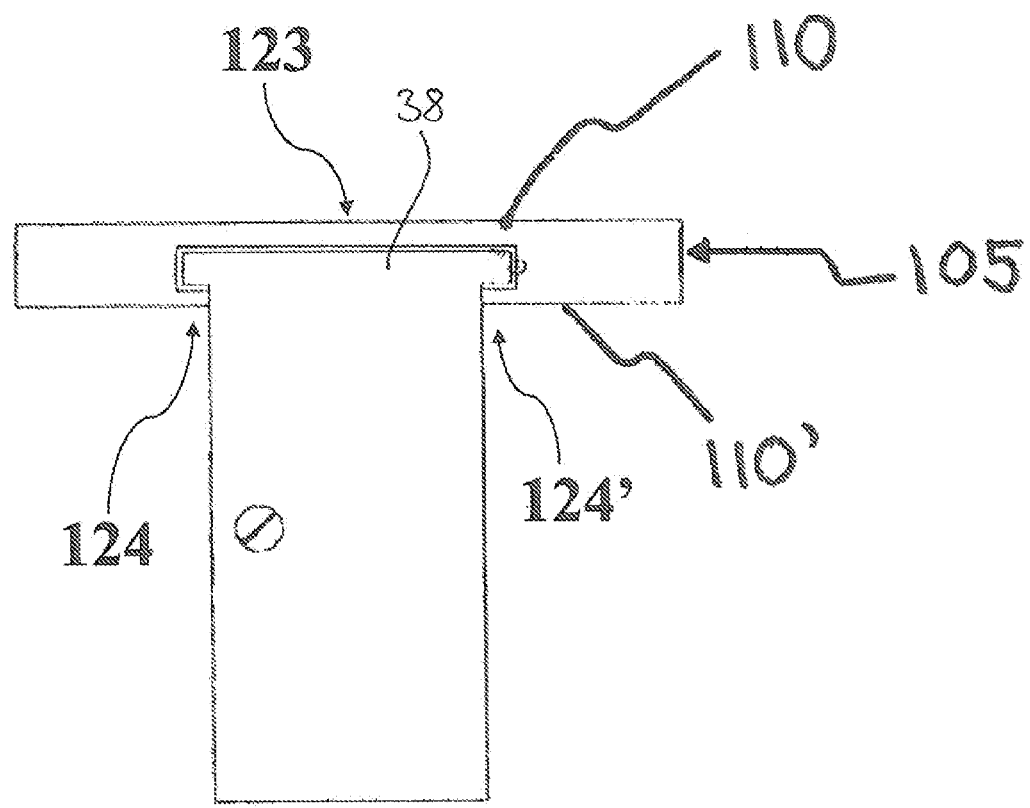
FIG. 5 is a bottom end view of the body of the combination square of FIG. 4 with the removable extension bracket slidingly received on the body of the combination square.

Referring to FIGS. 4 and 5, the removable extension bracket 105 has a slide channel 123 that extends the length of the removable extension bracket 105. The slide channel 123 comprises a lip on either side of the slide channel 123 that extends inwardly towards the slide channel 123 and along the length of the slide channel 123 to define a pair of recesses 124, 124'. In use, each of the guide flanges 36' and 38' of the body 35 is adapted to slidingly receive the removable extension bracket 105. The edges of the slide channel 123 locate over either guide flange 36' or 38'. The straight-edge surface 110 and guide flange 37', and the straight-edge surface 110' and guide flange 37' form 90° angles. However, it will be appreciated by persons skilled in the art that the angles between the straight-edge surface 110 and guide flange 37', and between the straight-edge surface 110' and guide flange 37' are not limited to 90° angles, and that other angles may be possible within the scope of the present invention.

Figure 6:
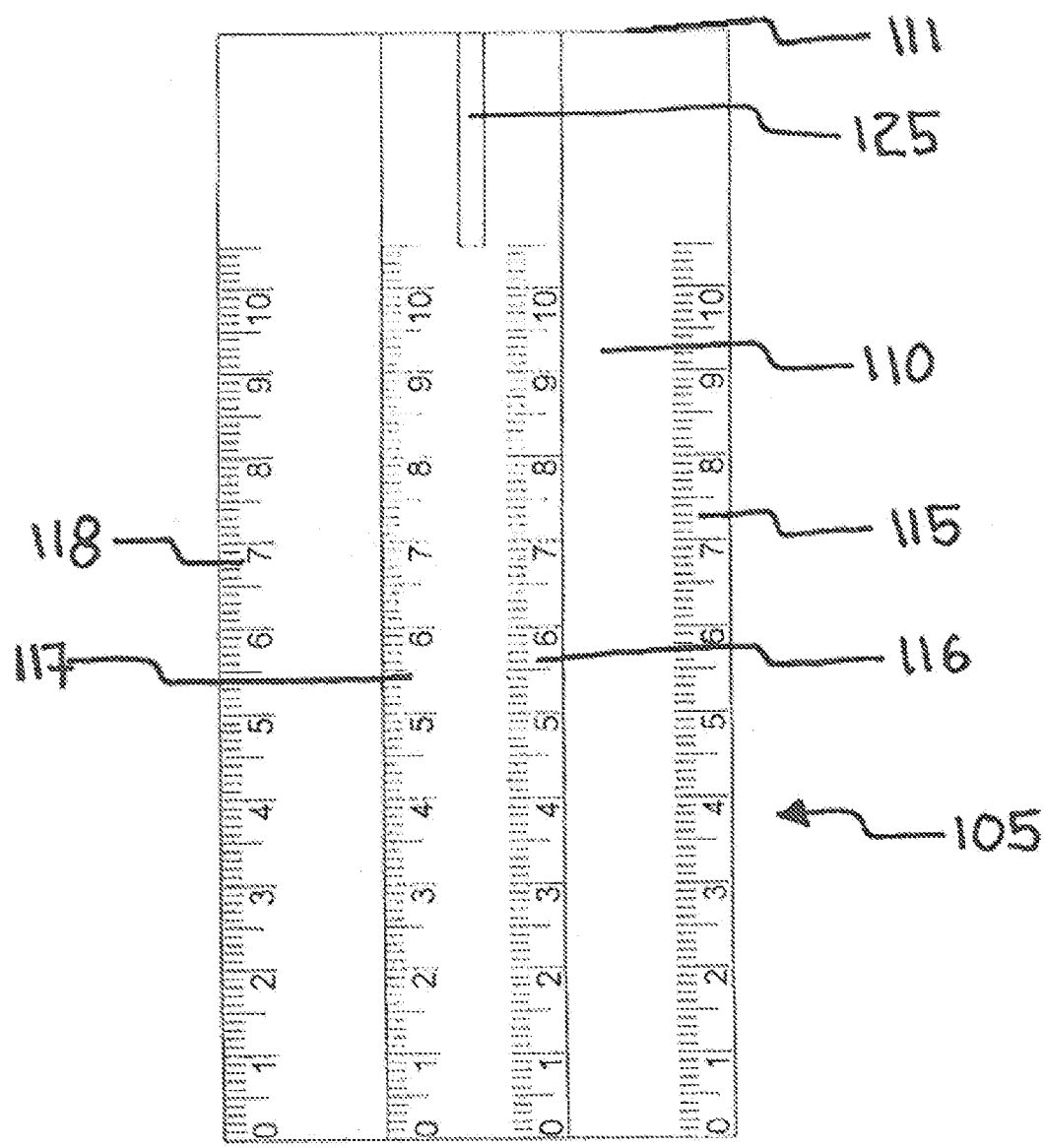
FIG. 6 is a right side elevational view of the removable extension bracket removed from the body of the combination square of FIG. 4.
Figure 7:
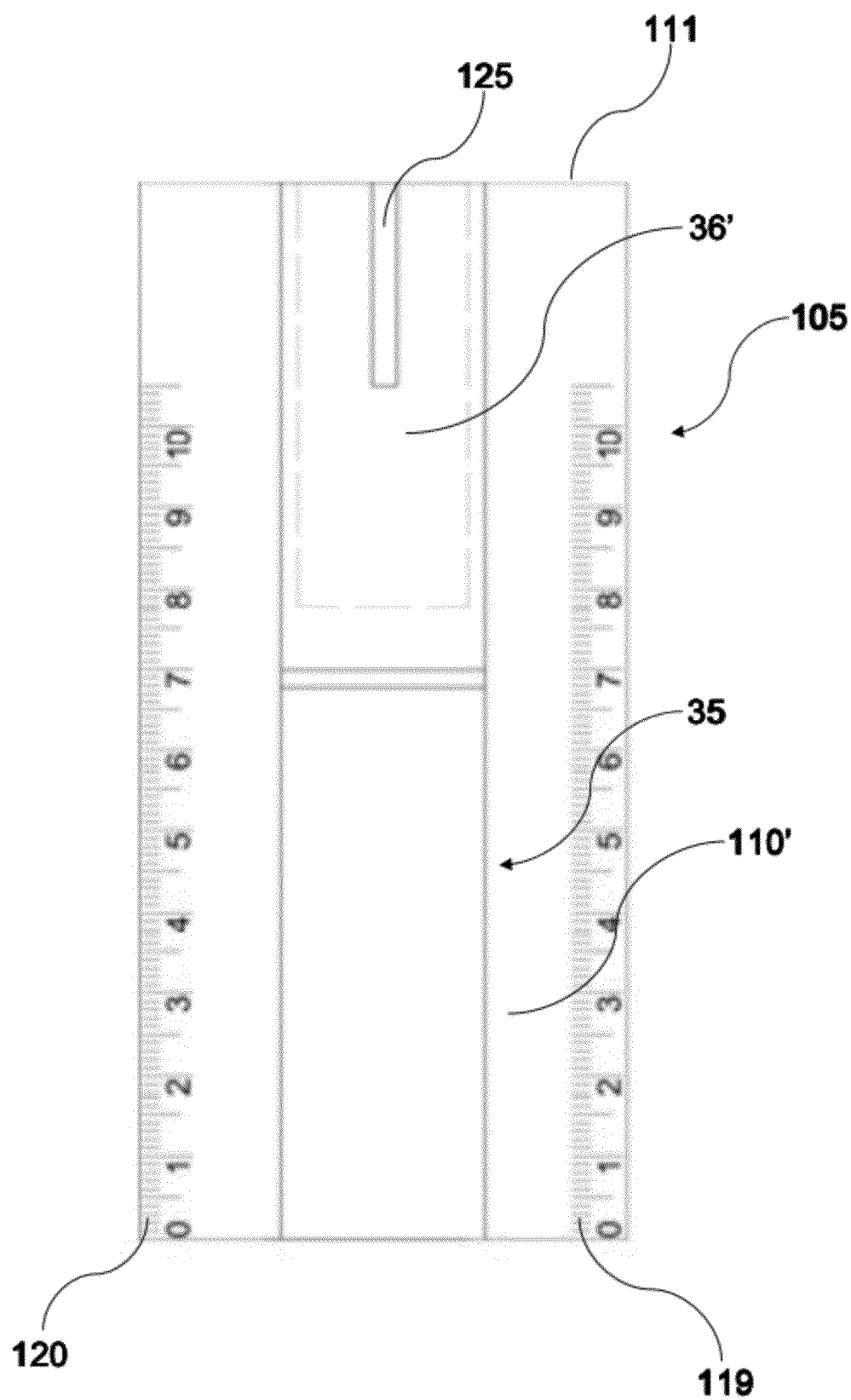
FIG. 7 is a left side elevational view of the removable extension bracket slidingly received on the body of the combination square of FIG. 4.

Referring to FIGS. 6 and 7, the removable extension bracket 105 comprises a slot 125 adapted to receive the blade 20 therein and permit sliding translation of the blade 20 parallel to the longitudinal axis of the blade 20, allowing the position of the blade 20 relative to the removable extension bracket 105 to be adjusted. The slot 125 is located in the slide channel 123 and extends along the length of the slide channel 123 to a length corresponding to the length of the slot in the body 35. In an exemplary embodiment, the slot 125 in the removable extension bracket 105 is adapted to receive the blade 20 completely therein, such that straight-edge 21 of the blade 20 is generally aligned with straight-edge surface 111 of the removable extension bracket 105. It will be appreciated by persons skilled in the art that the blade 20 may be partially received in the slot 125.

The removable extension bracket 105 may include one or more bracket scales disposed along at least one of the straight-edge surfaces 110 and 110' of the removable extension bracket 105. For example, bracket scales 115, 116, 117, 118, 119 and 120 are typically disposed along at least one of the straight-edge surfaces 110 and 110' of the removable extension bracket 105.

Referring to FIGS. 4 and 5, the straight-edge surfaces 110 and 110' of the removable extension bracket 105 are adapted to increase the surface area in contact with a work piece (not shown). The straight-edge surface 110 or 110' of the removable extension bracket 105 will be of sufficient width to enable a user to stably hold the combination square 10 with attached removable extension bracket 105 against a guiding surface of the work piece (not shown) to form an exact right angle with the working surface of the work piece. Advantageously, the removable extension bracket 105 allows the combination square 10 to be used in situations where the working surface and/or the work piece have radiused or otherwise irregular surfaces. The removable extension bracket 105 may be of any suitable width, making it simple to use when the guiding surface of the work piece is not at perfect right angles to the working surface of the work piece on which markings or cuts are to be made. For example, the combination square 10 with removable extension bracket 105 may be used without rocking or slipping where there is limited amount of contact between the working surface and the work piece at irregular surfaces such as fillets or chamfers.

Referring to FIGS. 6 and 7, the one or more bracket scales 115, 116, 117, 118, 119 and 120 on the removable extension bracket 105 provide reference points when the removable extension bracket 105 is used as a rule member for measuring or marking, for example, a work piece (not shown). It will be appreciated by persons skilled in the art that the bracket scales 115, 116, 117, 118, 119 and 120 may take the form of any one of a number of marking or measuring scales, including but not limited to any one or more of the following: the International System of Units; and Imperial Units.

In another embodiment, the combination square 10 further comprises a scribe guide (not shown) adapted to locate on the blade 20, the scribe guide having a scribe aperture (not shown) for receiving a scribe in use. In one example, the scribe guide comprises a top portion and a pair of opposing side portions extending down from the top portion, and curling inwards relative to each other to define a pair of overlap portions. The scribe aperture is located in the top portion, and preferably at a front edge of the top portion when located on the blade 20. The scribe guide is slidingly received on the blade 20 such that the top portion lies along a face of the blade 20, the two overlap portions overlap the edges of the blade 20, and the scribe aperture overhangs a tip of the blade 20. In an exemplary embodiment, the scribe guide has dimensions that conform to the dimensions of the blade 20 such that the scribe guide fits snugly on the blade 20 in use. The scribe aperture may be of any dimension useful for receiving the scribe and for facilitating marking or cutting. In the exemplary embodiment, the scribe aperture is an open aperture rather than an enclosed aperture such that the scribe is easily received within the scribe aperture. In one example of use, the combination square 10 is mounted against an edge of a work piece and oriented such that a face of the blade 20 is substantially level with a surface of the work piece to be marked. Holding the combination square 10 in one hand and holding a scribe in the scribe aperture with the other, the combination square 10 can be moved along the edge of the work piece while simultaneously marking the surface of the work piece with the scribe. In another embodiment, the blade 20 may comprise at least one longitudinal groove formed therein. For example, the groove may be formed in at least one edge of the blade 20 to slidingly receive one of the two overlap portions therein. In this example, the longitudinal groove may be of any length, but preferably, the groove has the same length as the scribe guide such that the end of the groove acts as a stop to prevent the scribe guide from sliding too far along the blade 20 in use.

In another embodiment, the scribe guide may comprise one or more brake portions adapted to abut with the tip of the blade 20 to prevent the scribe guide from sliding too far along the blade 20 in use. In this embodiment, the one or more brake portions may be located in the curl of the overlap portions or may be located at the front end of the scribe guide.

It will be appreciated that the scribe guide is not limited to just one scribe aperture, and that any number of scribe apertures may be located at the front end of the scribe guide to enable multiple marks or lines to be made. The scribe guide may be manufactured from any material suitable for performing this function. In an exemplary embodiment, the scribe guide is manufactured from a resilient material, including, but not limited to, one or more of the following: a polymer, a metal, a metal alloy, a ceramic.

Referring specifically to FIGS. 9 to 12, in another exemplary embodiment, removable extension bracket 405, having a substantially similar configuration to the removable extension bracket 105 described above, comprises one or more locating guides 445 and the body 35 further comprises one or more locating dimples 480 (see, e.g., FIG. 12), each locating dimple 480 being adapted to receive one of the one or more locating guides 445 therein for positively locating the removable extension bracket 405 at a selected position along the body 35. In this embodiment, the removable extension bracket 405 is slidingly received on one of the guide flanges 36' or 38' disposed on respective straight-edges 36 and 38 of the body 35.

Figure 9:
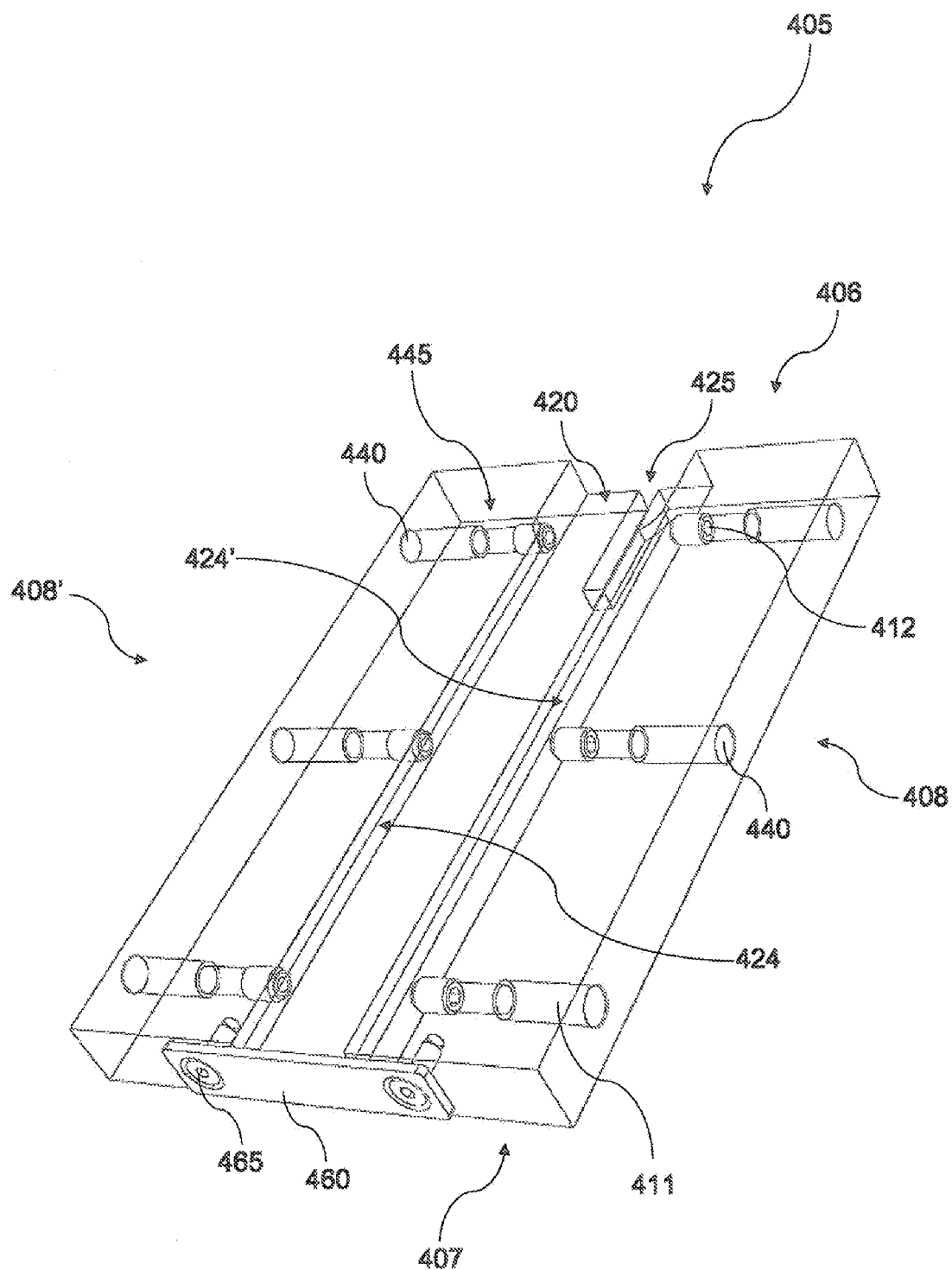
FIG. 9 is a transparent perspective view of the removable extension bracket of FIG. 4 further comprising one or more locating guides and a stopper.
Figure 10:
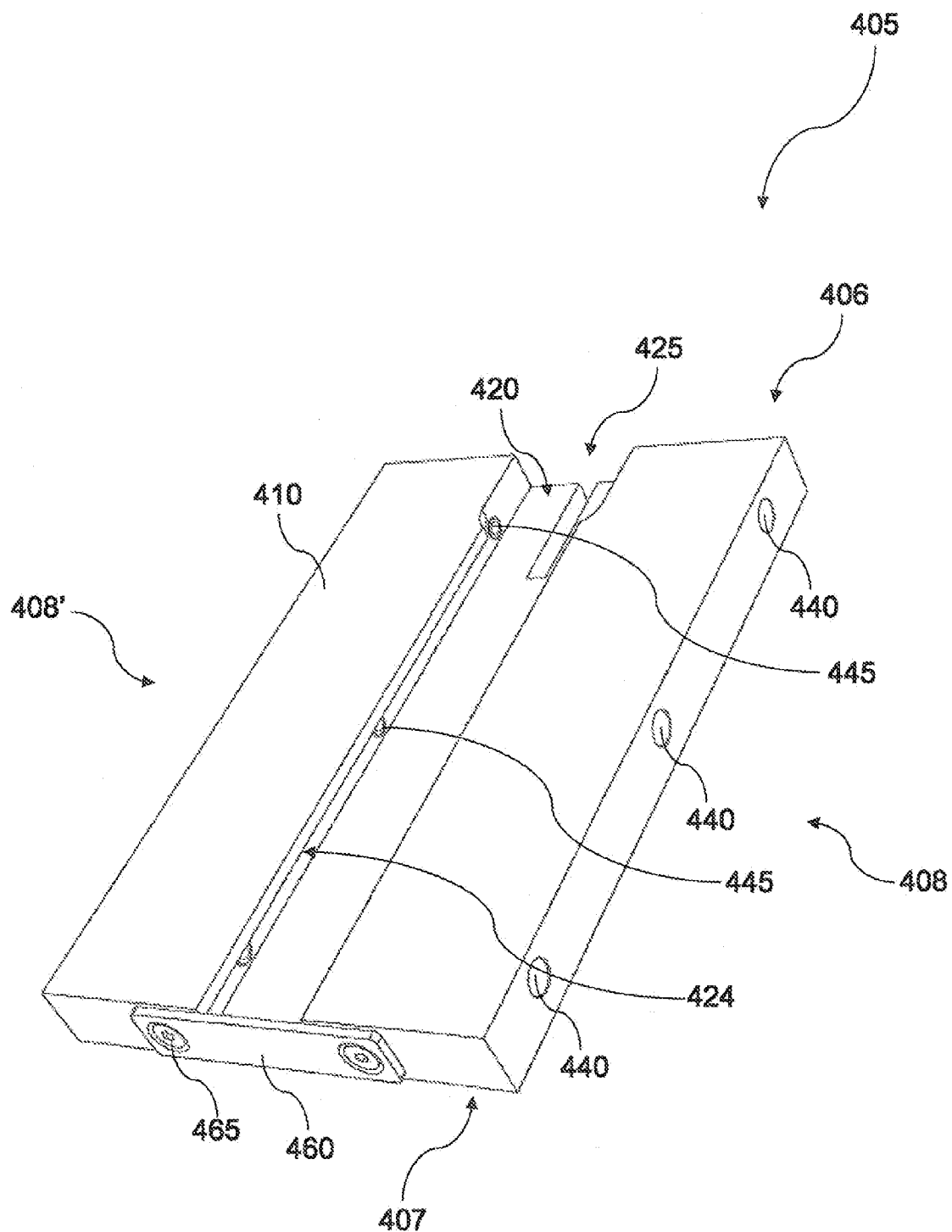
FIG. 10 is a perspective view of the removable extension bracket of FIG. 9.

As shown in FIGS. 9 and 10, the removable extension bracket 405 comprises a top portion 406, a bottom portion 407, two side portions 408, 408' and a slide channel 420 that extends the length of the removable extension bracket 405 from the top portion 406 to the bottom portion 407. The slide channel 420 comprises a lip on each side that extends inwardly and substantially along the length of the slide channel 420 from the top portion 406 to the bottom portion 407 to define a pair of recesses 424, 424'. In use, each of the guide flanges 36' and 38' of the body 35 is adapted to slidingly receive the removable extension bracket 405 such that the guide flanges 36', 38' locate in the slide channel 420 with the respective side edges of the guide flanges 36' and 38' locating in the corresponding recesses 124, 124'.

In the exemplary embodiment, the two side walls 408, 408' each comprise one or more apertures 440 that extend substantially through the side walls 408, 408' of the removable extension bracket 405 to the corresponding recess 424, 424' located either side of the slide channel 420. Each of the one or more apertures 440 has a diameter that varies along the length of the aperture 440, the diameter of the aperture 440 at the two side walls 408, 408' being greater than the diameter of the apertures 440 at the recesses 424, 424'. Each of the one or more locating guides 445 is adapted to locate within the aperture 440, each locating guide 445 having a diameter that is smaller than the diameter of the aperture 440 at the two side walls 408, 408', and larger than the diameter of the aperture 440 at the recesses 424, 424', such that when located in the apertures 440, each of the one or more locating guides 445 abuts the corresponding recess 424, 424' but does not pass substantially therethrough.

It will be appreciated that the number of apertures 440 in the two side walls 408, 408' is not limited to that as shown in FIGS. 9 and 10, but may be more or less depending on the requirements. The number of apertures 440, and, thus, the number of locating guides 445, will be such that the removable extension bracket 405 may be slidingly received on the guide flanges 36' and 38' of the body 35 uniformly and securely to maintain the accuracy of the combination square 10 as a measuring tool.

It will also be appreciated that, in other embodiments, only one of the two side walls 408, 408' of the removable extension bracket 405 may comprise one or more apertures 440 for receiving locating guides 445.

Figure 11:
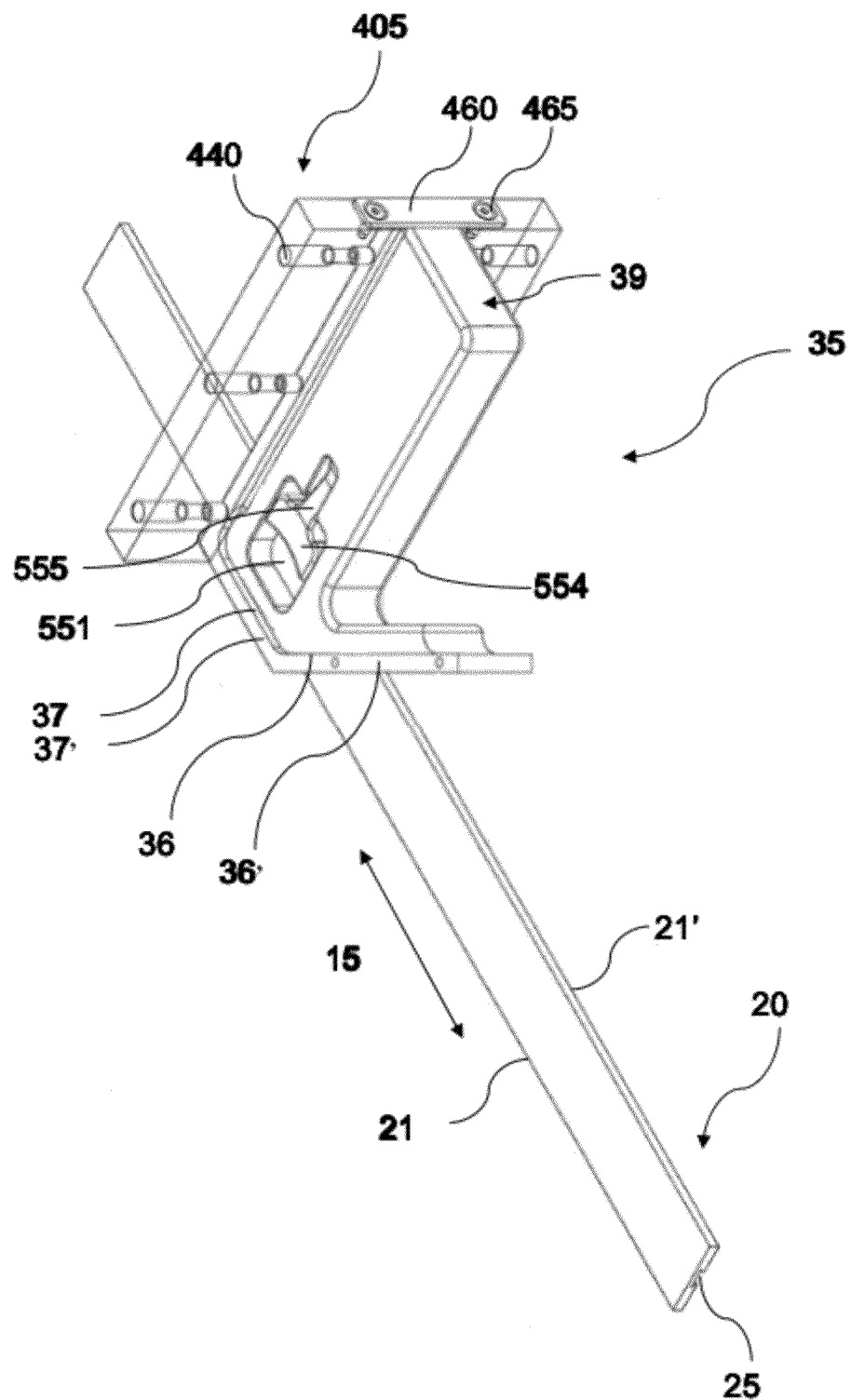
FIG. 11 is a perspective view of the combination square of FIG. 1 with the removable extension bracket of FIG. 9 slidingly received on the body.
Figure 12:
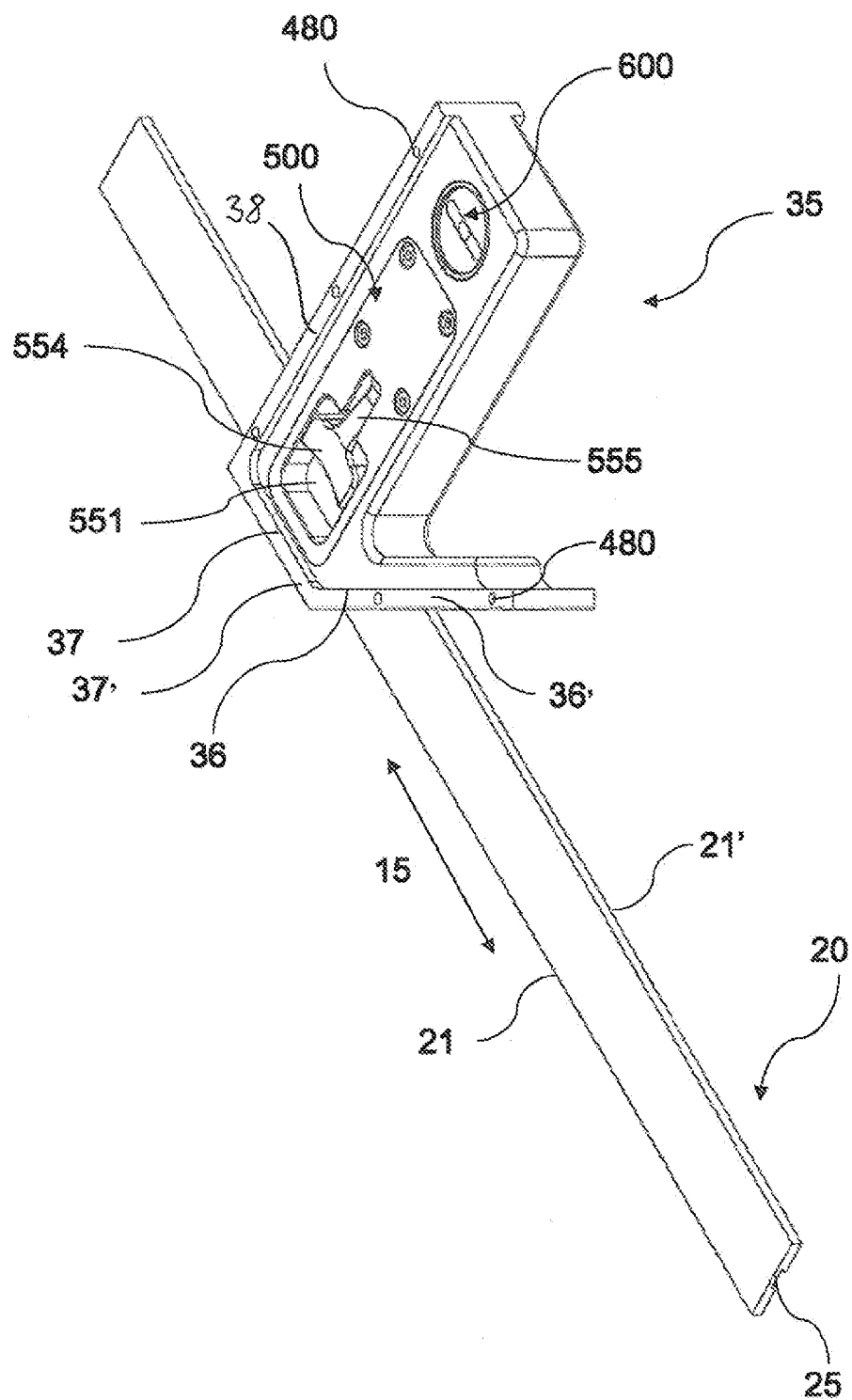
FIG. 12 is a perspective view of a combination square in accordance with another exemplary embodiment of the present invention, the combination square comprising a blade, a body, a lock module, and a leveling bubble assembly.

As shown in FIGS. 11 and 12, the one or more locating dimples 480 are located in the respective side edges of the guide flanges 36' and 38'. In this embodiment, the one or more dimples 480 are distributed evenly along the respective side edges on either side of the guide flanges 36' and 38', and the one or more apertures 440 are distributed evenly along the side walls 408, 408' of the removable extension bracket 405 and extending through the side walls 408, 408' to terminate at the corresponding recesses 424, 424' with an equivalent distribution. The even distribution of the one or more locating dimples 480 and one or more apertures 440 are identical, such that when the removable extension bracket 405 is located on one of the guide flanges 36', 38', the one or more apertures 440 and the one or more locating dimples can be brought into substantial alignment.

In use, therefore, each of the one or more locating guides 445 located in the one or more apertures 440 is received in a corresponding locating dimple 480 on the respective side edge of the guide flange 36' and 38'. The removable extension bracket 405 can, therefore, be slidingly received on one of the guide flanges 36', 38' at the selected position on the guide flange 36', 38'. The selected position is when the removable extension bracket 405 is substantially located on the guide flange 36', 38' such that each of the one or more locating dimples 480 receives a corresponding one of the one or more locating guides 445 such that each of the one or more locating guides 445 occupies a corresponding locating dimple 480.

In this embodiment, the one or more locating guides 445 each comprise an engaging member (not shown) and a compression spring that abuts the engaging member, urging the engaging member against the corresponding locating dimple 480 on the respective side edges on either side of the guide flanges 36' and 38'. The one or more locating guides 445 also comprise at a remote end, an adjustment screw 412 for adjusting the degree of compression in the compression spring. In this embodiment, the engaging member is a ball bearing (not shown) located at the end of the locating guide 445 substantially opposite the remote end 412, wherein the ball bearing has a diameter that is slightly larger than the diameter of the aperture 440 at the recess 424. 424' such that the ball bearing partly protrudes through the aperture 440 at the recess end 424, 424' to be received in the locating dimple 480 on the side edge of the guide flange 36', 38'. The compression spring is located within the locating guide 445 between the adjustment screw 412 and the ball bearing, such that the ball bearing is urged against the corresponding locating dimple 480. Therefore, in use, when the engaging members are urged against the corresponding locating dimples 480, they provide a degree of resistance affording the removable extension bracket 405 with a secure attachment to the guide flange 36', 38' of the body 35 and a degree of resistance to prevent the removable extension bracket 405 from undesirably sliding off the guide flange 36', 38' in use.

In this embodiment, and as shown in FIG. 9, the adjustment screw 412 has an external thread (not shown) and the removable extension bracket 405 has a complementary internal thread 411 adapted to meshingly receive the external thread of the adjustment screw 412, such that the axial position of the adjustment screw 412 can be accurately adjusted relative to the removable extension bracket 405. In use, therefore, the adjustment screw 412 enables the degree of compression in the compression spring to be efficiently and accurately adjusted such that the one or more locating guides 445 can be positioned in the corresponding aperture 440 in the removable extension bracket 405 so that there is sufficient spring force to urge the engaging member towards the corresponding locating dimple 480. This is beneficial in cases when, for example, the spring force of the compression springs deteriorates over time, such that the degree of compression can be adjusted using the adjustment screw 412, thereby prolonging the lifetime of the compression spring in the removable extension bracket 405. In addition, the compression springs and one or more locating guides 445 may be easily removed and replaced if required.

The removable extension bracket 405 further comprises a stopper adapted prevent the removable extension bracket 405 from applying a substantial force on the blade 20 in use. In an exemplary embodiment, and as shown in FIGS. 9 to 11, the stopper is a stopper plate 460 that is mounted to the bottom portion 407 of the removable extension bracket 405 using one or more screws 465, where it extends substantially across the bottom portion 407 of the removable extension bracket 405. In use, therefore, when the removable extension bracket 405 is slidingly received on one of the guide flanges 36' or 38' of the body 35, and the slot 425 concurrently receives the blade 20 therein, the stopper plate 460 abuts against a bottom portion 339 of the body 35 thus preventing the removable extension bracket 405 from substantially colliding with the blade 20 when it is slid onto one of the guide flanges 36' or 38'. This is beneficial in use, as the stopper plate 460 prevents the blade 20 and/or the slot 425 from becoming damaged over time by repeated removal and mounting of the removable extension bracket 405 on the guide flanges 36', 38' of the body 35, which could compromise the accuracy of the combination square 10 over time.

A first advantage of at least some of the above embodiments is that the combination square 10 offers significant reduction in operational time. The body 35 is generally formed with one or more smooth straight-edges 36, 37 and 38 set at predefined angles, for example, 90° and 45°, allowing the user to quickly construct or check the angles of a work piece. Furthermore, the body 35 has guide flanges 36', 37' and 38' disposed on respective straight-edges 36, 37 and 38 perpendicularly thereto for increasing the surface area in contact with a work piece such that marks or cuts can be rapidly made in the work piece. Advantageously, the removable extension bracket 105 allows the combination square 10 to be used in situations where a work piece has a radiused or otherwise irregular surface. The removable extension bracket 105 can be of any suitable width, making it simple to use when the guiding surface of a work piece is not at perfect right angles to the working surface of the work piece on which markings or cuts are to be made. For example, the combination square 10 may be used without rocking or slipping where there is limited amount of contact between the working surface and the work piece at irregular surfaces such as fillets or chamfers. In addition, the removable extension bracket 105 can be easily and swiftly installed or replaced on the body 35 of the combination square through sliding engagement. Advantageously, the scales on the blade 20, body 35 and removable extension bracket 105 provide reference points when the combination square 10 is used as a measuring or marking device on a work piece.

A second advantage of at least some of the above embodiments is that the combination square 10 is simple and user friendly. The lock 50 allows simple, quick and efficient locking and adjustment of the position of the blade 20 relative to the body 35. Furthermore, the body 35 and lock 50 are sized, shaped, and relatively disposed to enable easy and swift operation with, for example, one hand. Advantageously, the location of the lock 50 in a generally medial position of the body 35 allows the combination square to be operable by either left handed or right handed users. The lock 50 can be put in the locked configuration by applying a direct clockwise moment to the lever portion 54 of the locking arm 55 and the lock 50 can be put in the released configuration by applying a direct anti-clockwise moment to the lever portion 54. Additionally, a user can fix the blade 20 at a selected position relative to the body 35 of the combination square 10 with a first hand and using the second hand, grip the body 35 of the combination square 10 while putting the lock 50 in the locked configuration by applying a clockwise moment to the lever portion 54 of the locking arm 55. Alternately, a user can put the lock 50 in the released configuration by applying an anticlockwise moment to the lever portion 54 of the locking arm 55 with the second hand and then adjusting the position of the blade 20 relative to the body 35 of the combination square 10 using the first hand. Advantageously, the clockwise moment applied to the lever portion 54 of the locking arm 55 is transmitted into a lateral clamping force on the blade 20. Furthermore, the degree of compression in the compression spring 70 can be efficiently and accurately adjusted using the adjustment screw 75. Advantageously, the locking pin 85 and compression spring arrangement 69 are housed within the body 35 such that any possibility of inadvertently disturbing the locking pin 85 and compression spring arrangement 69 during use is reduced. Additionally, the locking arm 55 is flush with the body 35 of the combination square 10 when the lock 50 is in the locked configuration thus reducing the possibility of inadvertently putting the lock 50 in the released configuration. For each of these reasons, the combination square 10 is easy and efficient to use.

A third advantage of at least some of the above embodiments is that the combination square 10 offers a sturdy and accurate means of use. Advantageously, the slot 60 and the blade 20 have complementary dimensions to ensure accurate alignment of the blade 20 within the body 35. Similarly, the slot 125 in the removable extension bracket is dimensionally consistent with the slot in the body 35 such that the accuracy of the combination square is maintained. Additionally, the lock 50 achieves reliable and secure releasable locking of the blade 20 relative to the body 35 to provide a combination square 10 with a sturdy locking mechanism. Furthermore, the dovetailed cross-sections of the groove 25 and the protrusion 90 provide the blade 20 with a desirable one degree of freedom when the lock 50 is in the released configuration. This allows the blade 20 to slide predictably within the slot 60 of the body 35 when the lock 50 is in the released configuration. Advantageously, the meshing of the pinion teeth 100 with the cam teeth 95 allows the cam portion 56 to grip the locking pin 85 when moving the locking pin 85 to the released position. For each of these reasons, the accuracy and reliability of the combination square 10 is improved.

A fourth advantage of at least some of the above embodiments is that the combination square 10 is simple to manufacture. This reduces cost for the following reasons:
1. The blade 20 and body 35 of the combination square 10 may be manufactured from any suitable engineering material so as to be useful in a variety of situations. For example, where rusting is a concern, the combination square 10 may be made of a suitable metal, for example, stainless steel, aluminum, brass, or a suitable polymer or ceramic; where weight is a concern, the blade may be manufactured from aluminum or any suitable engineering polymer.
2. The length of the blade 20 may be sized so as to be useful in a variety of situations.
3. The removable extension bracket 105 may be of any suitable length.
4. The protrusion 90 may be released from the groove 25 at either ends of the blade 20 allowing the blade 20 to be removable from the body 35. This may allow one or more additional blades to be interchangeably used with the combination square 10.

According to a third embodiment of the present invention and referring specifically to FIGS. 13 to 17, there is provided a combination square 10, comprising: a blade 20; a body 35 comprising a slot adapted to receive the blade 20 therein and permit sliding translation of the blade 20 parallel to the longitudinal axis of the blade 20, allowing the position of the blade 20 to be adjusted relative to the body 35; and a lock module 500 attachable to the body 35 and comprising a lock 550, the lock 550 adapted to lock the position of the blade 20 relative to the body 35 in a locked configuration and to allow adjustment of the position of the blade 20 relative to the body 35 in a released configuration. The lock module 500 comprises a locking pin 585, the locking pin 585 moveable in the lock module 500 in a direction generally parallel to the longitudinal axis of the body 35, between a locked position where the lock 550 is in the locked configuration and a released position where the lock 550 is in the released configuration. The blade 20 comprises a longitudinal groove formed therein, and the locking pin 585 comprises a protrusion 590 at an engagement end 580' thereof, the protrusion 590 being adapted to engage with and slide in the groove 25. The groove 25 is generally dovetailed in cross-section and the protrusion 590 is complementary in cross-section such that the protrusion 590 is held within the groove 25. In this embodiment, the locking pin 585 exerts a lateral clamping force on the blade 20 via the protrusion 590 when the locking pin 585 is in the locked position, and no clamping force when the locking pin 585 is in the released position. The locking pin 585 further comprises a transverse extension 565.

Figure 13:
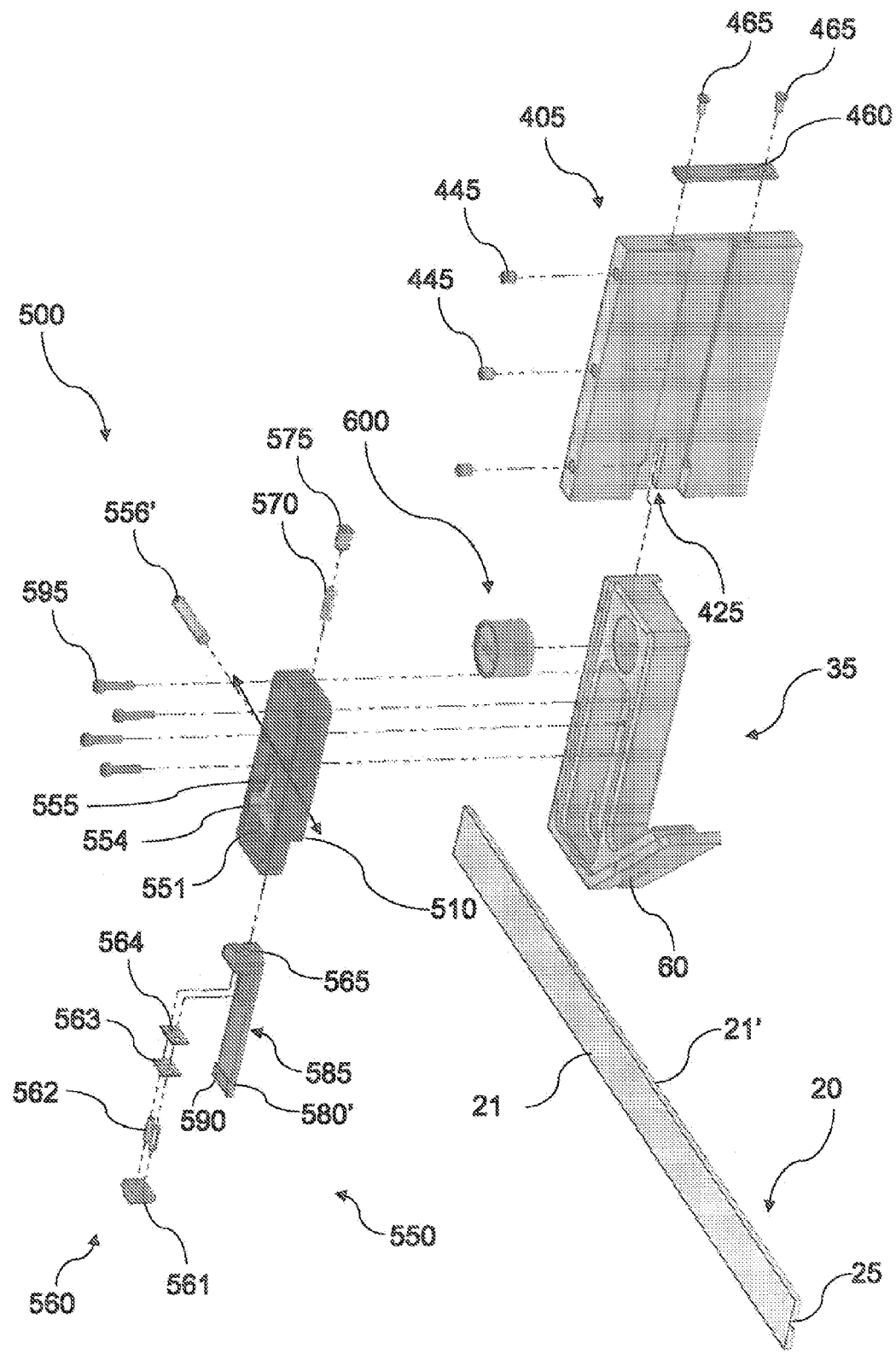
FIG. 13 is an exploded, perspective view of the combination square of FIG. 12, further comprising a removable extension bracket.

As shown specifically in FIG. 13, the lock module 500 can be removed from the body 35 of the combination square 10 if required. It will be appreciated that this may be necessary to service or repair the lock module 500. The lock module 500 has an outer casing 510 that is attached in the body 35 by one or more bolts, given the general reference numeral 595. The bolts 595 locate in an inner surface (not shown) of the body 35 to secure the lock module 500 therein.

As shown in FIGS. 13 to 17, the lock module 500 further comprises a locking arm 555 rotatably mounted to the lock module 500 and movable between a locked position in which the lock 550 is in the locked configuration and an unlocked position in which the lock 550 is in the released configuration, and having a cam portion 556, and a clamp subassembly 560 adapted to locate between the cam portion 556 and the transverse extension 565, the clamp subassembly 560 comprising a clamp member 561 having a cam follower portion (not shown), the cam portion 556 applying a force to the cam follower portion of the clamp member 561, causing the locking pin 585 to be held in the locked position and, thus, when the locking arm 555 is in the locked position, the lock 550 is maintained in the locked configuration until the locking arm 555 is moved towards the unlocked position. As shown in FIGS. 14 to 17, the locking arm 555 is mounted within the outer casing 510 of the lock module 500 by a spindle 556' that provides the axis of rotation by which the locking arm 555 rotates.

In an exemplary embodiment, the clamp subassembly 560 further comprises a first biasing member located between the clamp member 561 and the transverse extension 565 for biasing the lock 550 towards the locked configuration. In this embodiment, the first biasing member is a wave spring 563. However, it will be appreciated that any type of suitable compression spring may be employed in this clamp subassembly 560, including, but not limited to, any one of the following: a compression spring, a (treated) polymer or a (treated) rubber. The clamp subassembly 560 further comprises one or more pins 562, and the clamp member 561, the wave spring 563 and the transverse extension 565 each comprise one or more apertures adapted to receive the one or more pins 562 therethrough. In this configuration, the one or more pins 562 being received within the one or more apertures stabilize the clamp subassembly 560 thereby ensuring that the wave spring 563 provides a more precise and balanced load when biasing the lock 550 towards the locked configuration. The one or more apertures in the clamp member 561 have a diameter that is slightly smaller than the outside diameter of the one or more pins 562, such that in use, the one or more pins 562 are tightly and securely received in the clamp member 561, thereby limiting the chance that the one or more pins 562 will become free of the clamp member 561.

In the exemplary embodiment, the cam portion 556 has a generally elliptical cam profile having a major and a minor axis, such that the cam portion 556 abuts cam follower portion (not shown) of the clamp member 561 at a point on the cam profile that is on the major axis of the cam portion 556. Due to the generally elliptical nature of the cam profile, when an anti-clockwise moment is applied to the lever portion 554 of the locking arm 555, the locking arm 555 rotates about the axis of rotation of the spindle 556', the major axis of the cam portion 556 acts as a lever causing a force to be applied to the cam follower portion, this forces clamp member 561 against the wave spring 563, which, in turn, forces the transverse extension 565 of the locking pin 585 towards the locked position, where it remains until such time as a clockwise moment is applied to the lever portion 554 to cause the locking arm 555 to move towards the unlocked position. In this situation, as force is applied to the cam follower portion, the clamp member 561 drives the one or more pins 562 further into the corresponding apertures in the transverse extension 565. The wave spring 563 is subsequently forced into compression and a corresponding reaction force is produced. The lock 550 further comprises a biasing arrangement having a second biasing member that abuts the transverse extension 565, urging the transverse extension 565 against the clamp subassembly 560, and at a remote end an adjustment screw 575 for adjusting the degree of compression in the second biasing member. In use, the lock 550 can be easily switched between the locked configuration and the released configuration using the locking arm 555, such that the force applied by the cam portion 556 is sufficient to maintain the lock 550 in the locked configuration. The biasing arrangement helps to gently push the locking arm 555 towards the locked position when it is in the unlocked position, thereby providing a degree of pre-tension to the locking arm 555. Advantageously, the degree of compression in the second biasing member can be efficiently and accurately adjusted using the adjustment screw 575. In the exemplary embodiment, the second biasing member is a compression spring 570 and the biasing arrangement is adapted to allow movement of the locking pin 585 to accommodate changes in distance between the cam portion 556 and the clamp subassembly 560 during rotation of the locking arm 555. In use, the biasing arrangement ensures that there is a constant load applied to the cam portion 556 as the locking arm 555 is rotated between the locked position and the unlocked position. The body 35 comprises an internal cavity to receive the movable locking pin 585 and the biasing arrangement. This is beneficial as the locking pin 585 and biasing arrangement are housed within the body 35 such that any possibility of inadvertently disturbing the locking pin 585 and biasing arrangement during use, for example, is reduced. The clamp subassembly may further comprise one or more shim spacers 564 adapted to locate between the wave spring 563 and the transverse extension 565. The shim spacers 564 may be necessary in situations where, for example, the clamp subassembly 560 has been well used and the wave spring 563 has deteriorated over time such that the load applied to the cam portion 556 has lessened. In this respect, rather than replace the wave spring 563 it may be simpler to introduce one or more shim spacers 564 to provide the clamp subassembly 560. In this embodiment, it will be appreciated that the one or more shim spacers 564 comprise one or more apertures adapted to receive the one or more pins 562 therethrough. In this embodiment, the one or more shim spacers 564 are manufactured from a hardened material such as, for example, steel. It will be appreciated that other suitable hardened materials may be employed as shim spacers 564.

Figure 14:
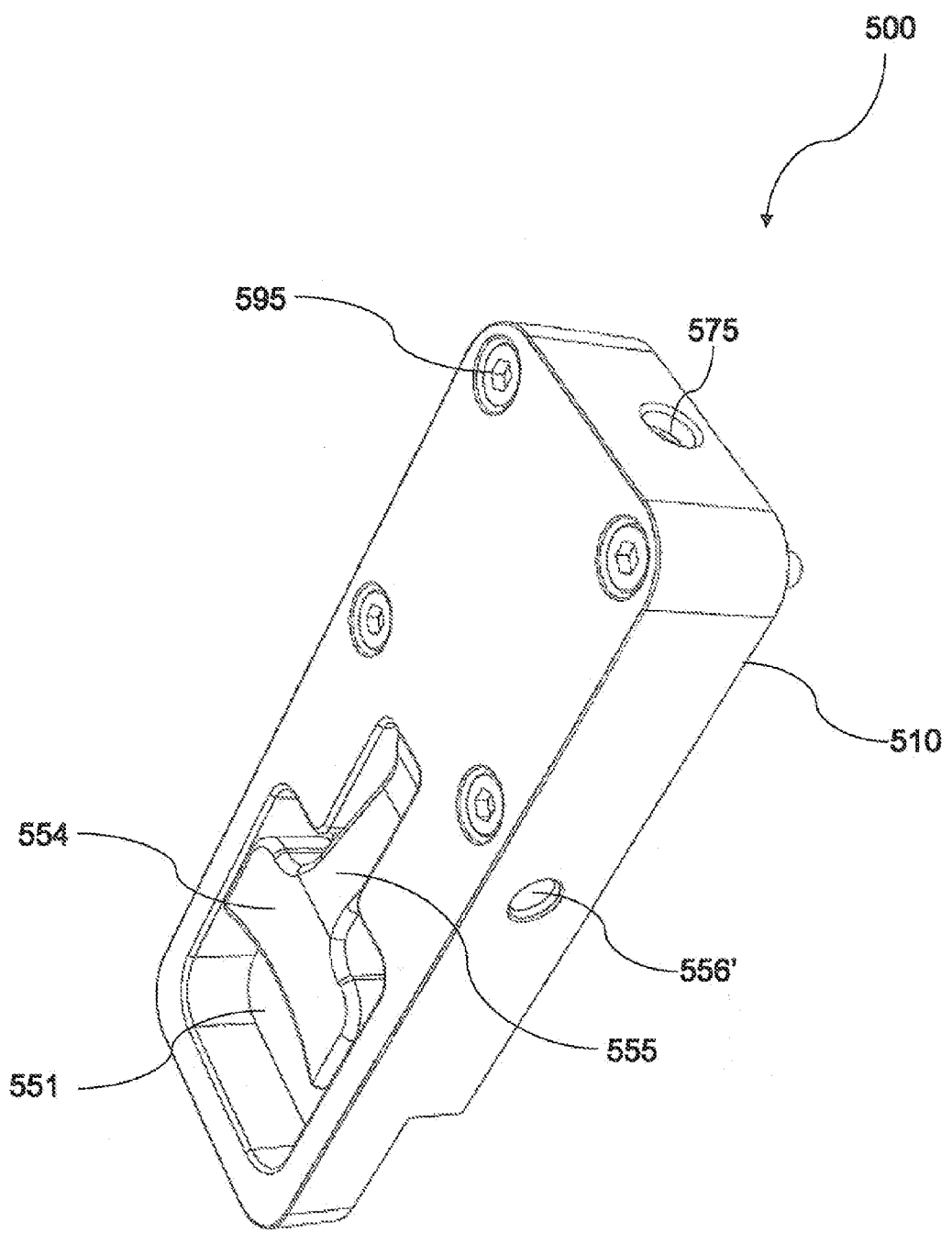
FIG. 14 is an enlarged perspective view of the lock module of FIGS. 12 to 13.
Figure 15:
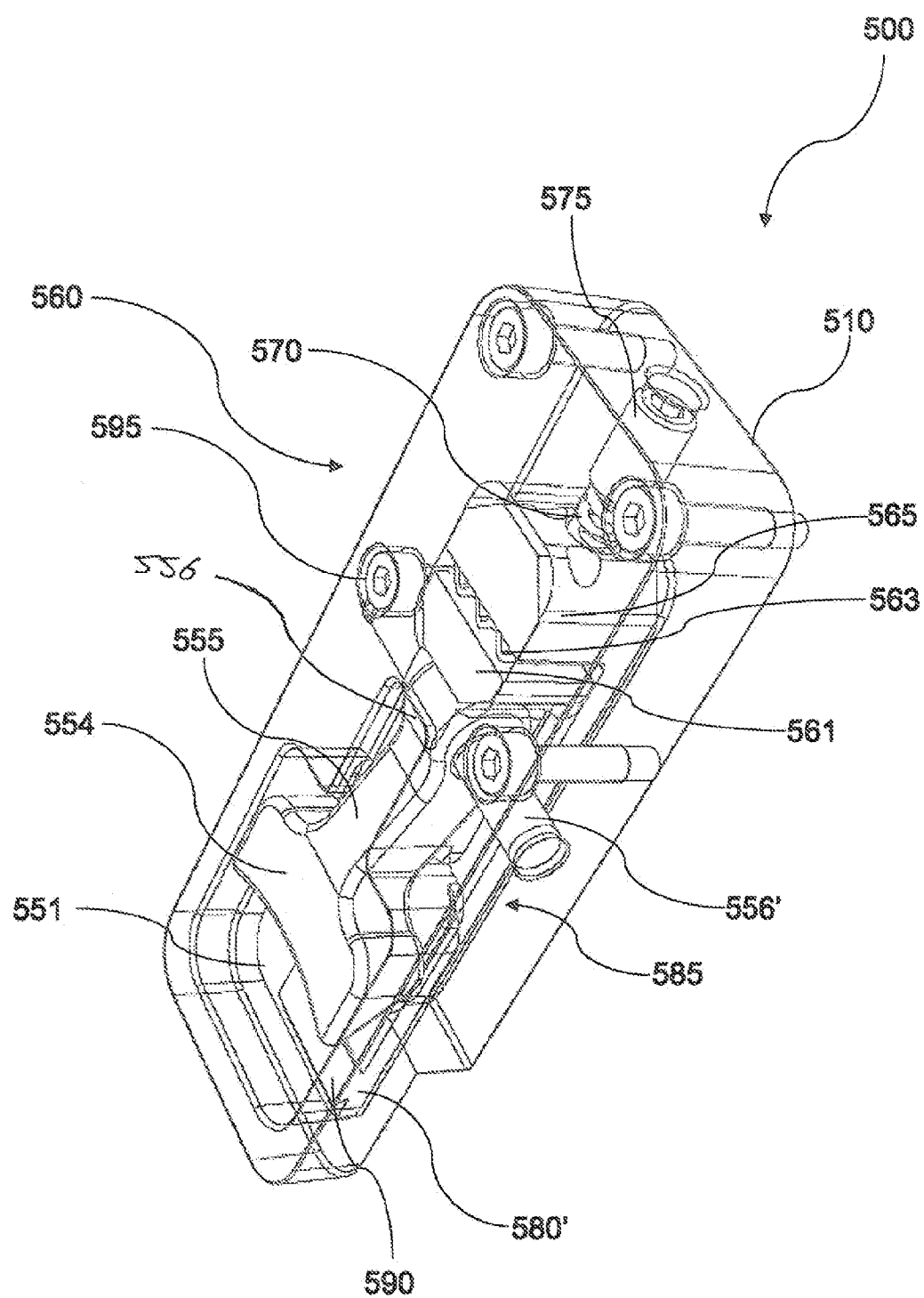
FIG. 15 is an enlarged, partially transparent, perspective view of the lock module of FIG. 14 with an outer casing of the lock module shown as transparent.
Figure 16:
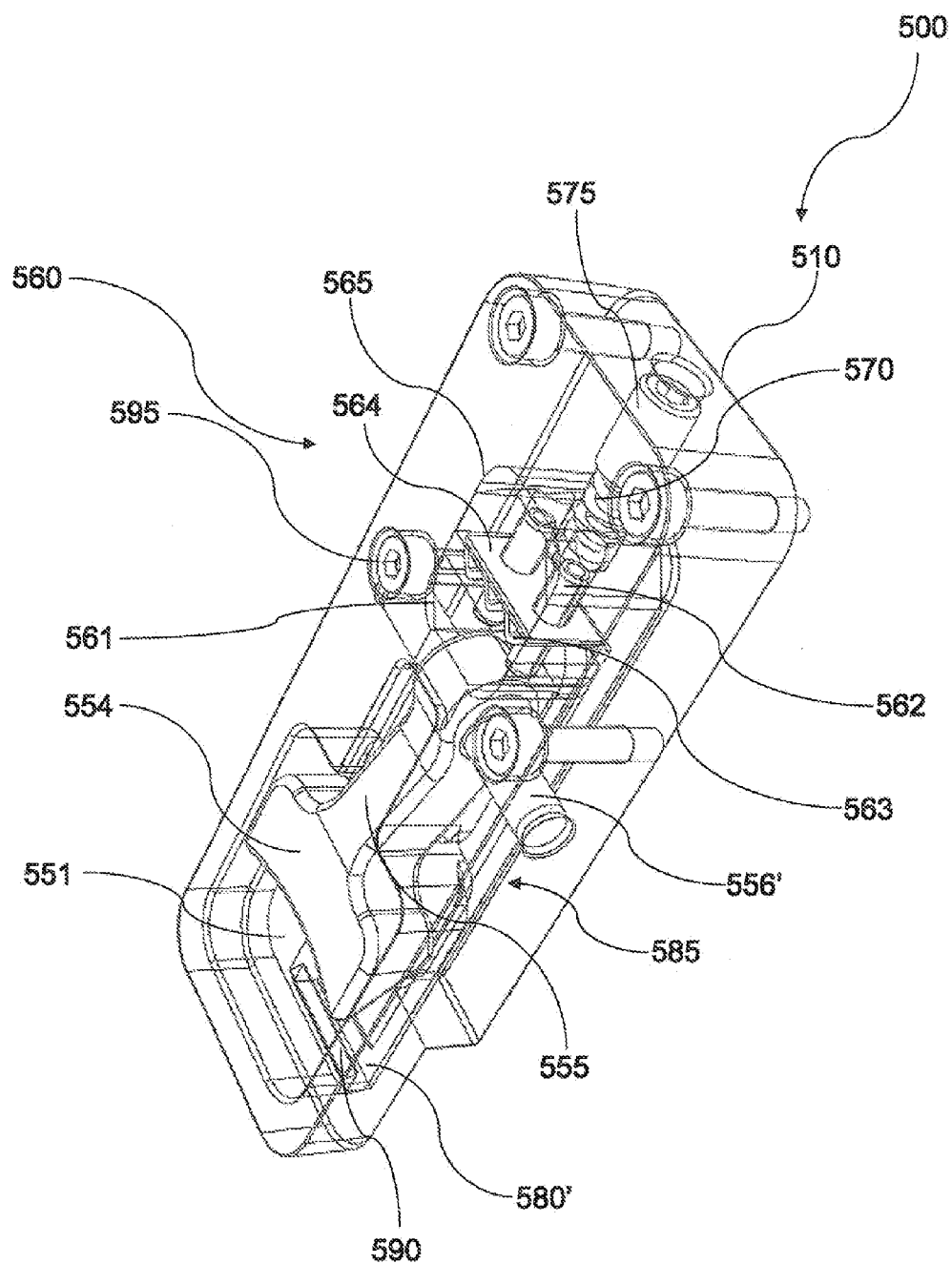
FIG. 16 is an enlarged, partially transparent, perspective view of the lock module of FIG. 15, the module lock comprising a lock and a clamp subassembly, the outer casing of the lock module and the clamp subassembly being shown as transparent.
Figure 17:
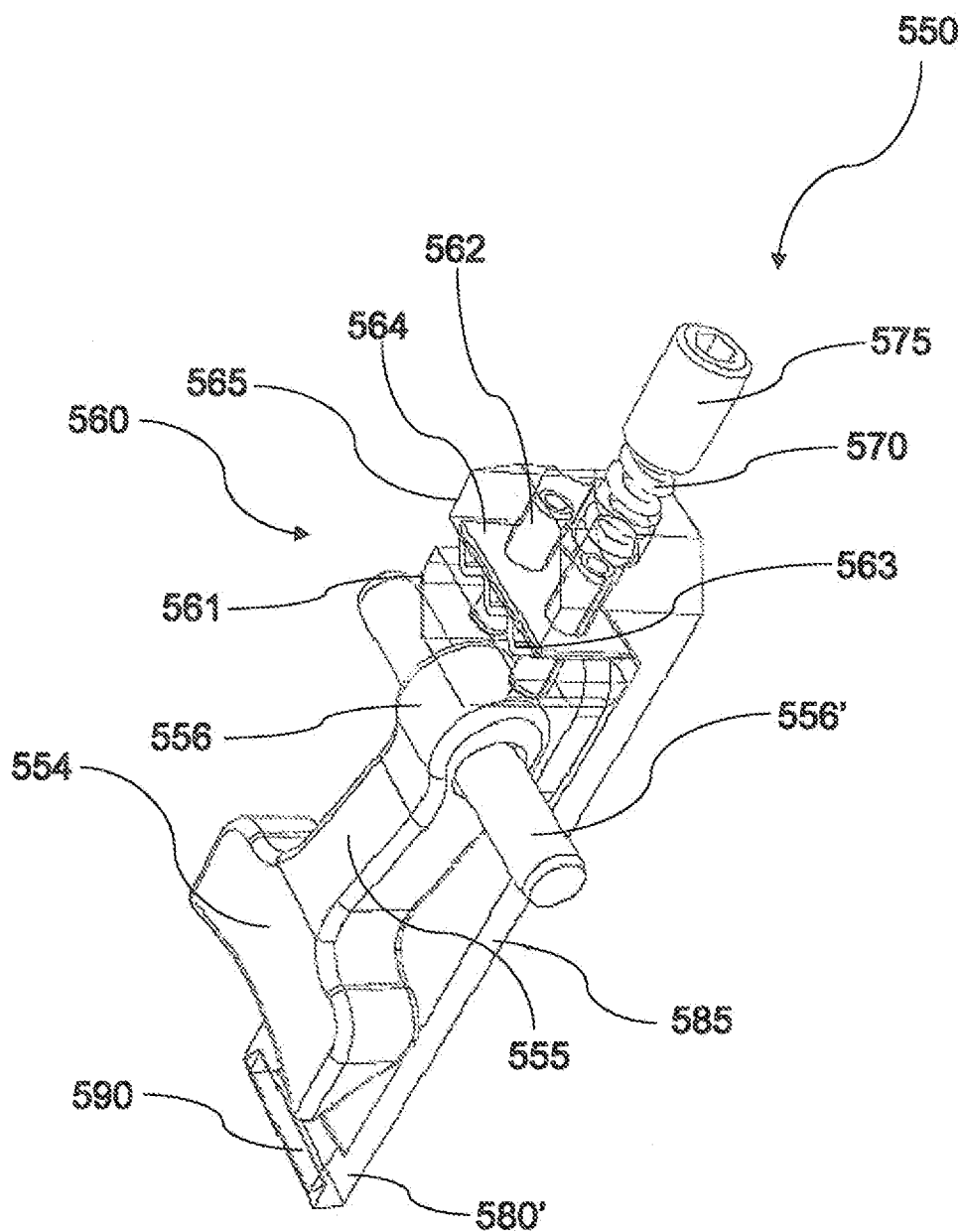
FIG. 17 is an enlarged, partially transparent, perspective view of the lock of FIG. 16, wherein the lock comprises a locking pin shown as transparent.

In the exemplary embodiment, the adjustment screw 575 has an external thread (not shown) and the lock module 500 has a complementary internal thread (not shown) adapted to meshingly receive the external thread of the adjustment screw 575, such that the axial position of the adjustment screw 575 can be accurately adjusted relative to the lock module 500. As shown in FIGS. 13 and 14, the outer casing 510 comprises an aperture to enable a user to gain access to the adjustment screw 575 to accurately adjust the axial position of the adjustment screw 575 relative to the lock module 500. This is beneficial as it enables the user to adjust the adjustment screw 575 for adjusting the degree of compression in the second biasing member without having to first open the outer casing 510.

According to a fourth embodiment of the present invention and referring specifically to FIGS. 8 to 11, there is provided a combination square 10, comprising: a blade 20; a body 35 comprising a slot 60 adapted to receive the blade 20 therein and permit sliding translation of the blade 20 parallel to the longitudinal axis of the blade 20, allowing the position of the blade 20 to be adjusted relative to the body 35; a lock module 500 attachable to the body 35 and comprising a lock 550, the lock 550 adapted for releasably locking the position of the blade 20 relative to the body 35; and a removable extension bracket 405 being wider than and removable from the body 35 and comprising one or more working surfaces. The body 35 is adapted to slidingly receive the removable extension bracket 405 which is slidingly received on the body 35 perpendicular to the blade 20. The removable extension bracket 405 comprises a slot 425 adapted to receive the blade 20 therein and permit sliding translation of the blade 20 parallel to the longitudinal axis of the blade 20, allowing the position of the blade 20 relative to the removable extension bracket 495 to be adjusted. In the exemplary embodiment, the slot 425 in the removable extension bracket 405 is dimensionally consistent with the slot 60 in the body 35 such that the accuracy of the combination square 10 is maintained. Referring specifically to FIGS. 9 to 11, removable extension bracket 405, having a substantially similar configuration to the removable extension bracket 105 described above, further comprises one or more locating guides 445 and the body 35 further comprises one or more locating dimples 480, each locating dimple 480 being adapted to receive one of the one or more locating guides 445 therein for positively locating the removable extension bracket 405 at a selected position along the body 35. In this embodiment, the removable extension bracket 405 is slidingly received on one of the guide flanges 36' or 38' disposed on respective straight-edges 36 and 38 of the body 35.

As shown in FIGS. 9 and 10, the removable extension bracket 405 comprises a top portion 406, a bottom portion 407, two side portions 408, 408' and a slide channel 420 that extends the length of the removable extension bracket 405 from the top portion 406 to the bottom portion 407. The slide channel 420 comprises a lip on either side of the slide channel 420 that extends inwardly towards the slide channel 420 and extends substantially along the length of the slide channel 420 from the top portion 406 to the bottom portion 407 to define a pair of recesses 424, 424'. In use, the guide flanges 36' and 38' of the body 35 are adapted to slidingly receive the removable extension bracket 405 such that the guide flanges 36', 38' of the body 35 locate in the slide channel 420 with the respective side edges of the guide flanges 36' and 38' locating in the corresponding recesses 124, 124' to form a snug fit.

The two side walls 408, 408' each comprise one or more apertures 440 that extend substantially through the side walls 408, 408' of the removable extension bracket 405 to the corresponding recess 424, 424' located either side of the slide channel 420. Each of the one or more apertures 440 has a diameter that varies along the length of the aperture 440, the diameter of the aperture 440 at the two side walls 408, 408' being greater than the diameter of the apertures 440 at the recesses 424, 424'. Each of the one or more locating guides 445 is adapted to locate within the aperture 440, each locating guide 445 having a diameter that is smaller than the diameter of the aperture 440 at the two side walls 408, 408', and larger than the diameter of the aperture 440 at the recesses 424, 424', such that when located in the apertures 440, each of the one or more locating guides 445 abuts the corresponding recess 424, 424' but does not pass substantially therethrough.

As shown in FIGS. 12 and 13, the one or more locating dimples 480 are located in the respective side edges on either side of the guide flanges 36' and 38'. In this embodiment, the one or more dimples 480 are distributed evenly along the respective side edges on either side of the guide flanges 36' and 38', and the one or more apertures 440 are distributed evenly along the side walls 408, 408' of the removable extension bracket 405 and extending through the side walls 408, 408' to terminate at the corresponding recesses 424, 424' with an equivalent distribution. The even distribution of the one or more locating dimples 480 and one or more apertures 440 are identical, such that when the removable extension bracket 405 is located on one of the guide flanges 36', 38', the one or more apertures 440 in the removable extension bracket 405 and the one or more locating dimples 480 on the side edge of the guide flange 36', 38' substantially align.

In use, therefore, each of the one or more locating guides 445 located in the one or more apertures 440 is received in a corresponding locating dimple 480 on the respective side edge of the guide flange 36' and 38'. The removable extension bracket 405 can, therefore, be slidingly received on one of the guide flanges 36', 38' at the selected position on the guide flange 36', 38'. The selected position is when the removable extension bracket 405 is substantially located on the guide flange 36', 38' such that each of the one or more locating dimples 480 receives a corresponding one of the one or more locating guides 445 such that all of the one or more locating guides 445 occupy a locating dimple 480.

Advantageously, the removable extension bracket 405 can be positively located on the body 35 of the combination square 10 each time it is mounted at the selected position of the body 35.

Advantageously, each of the one or more locating guides 445 fits snugly within the corresponding locating dimple 480 at the selected position of the body 35 of the combination square 10 to produce a secure fitting.

In this embodiment, the one or more locating guides 445 each comprise an engaging member (not shown) and a compression spring (not shown) that abuts the engaging member, urging the engaging member against the corresponding locating dimple 480 on the respective side edges on either side of the guide flanges 36' and 38'. The one or more locating guides 445 also comprise, at a remote end, an adjustment screw 412 for adjusting the degree of compression in the compression spring. In this embodiment, the engaging member is a ball bearing (not shown) located at the end substantially opposite the remote adjustment screw 412 at the remote end, wherein the ball bearing has a diameter that is slightly larger than the diameter of the aperture 440 at the recess end 424. 424' such that in use, the ball bearing partly protrudes through the aperture 440 at the recess end 424, 424' to be received in the locating dimple 480 on the side edge of the guide flange 36', 38'. The compression spring is located within the locating guide 445 between the adjustment screw 412 and the ball bearing, such that the compression spring urges the ball bearing against the corresponding locating dimple 480. In use, when the ball bearings are urged against the corresponding locating dimples 480, they provide the removable extension bracket 405 with a secure attachment to the guide flange 36', 38' of the body 35 and a degree of resistance to prevent the removable extension bracket 405 from undesirably sliding off the guide flange 36', 38' in use.

In this embodiment, and as shown in FIG. 9, each of the adjustment screws 412 has an external thread (not shown) and the removable extension bracket 405 has a complementary internal thread 411 adapted to meshingly receive the external thread of the adjustment screw 412, such that the axial position of the adjustment screw 412 can be accurately adjusted relative to the removable extension bracket 405. In use, therefore, the adjustment screw 412 enables the degree of compression in the compression spring to be efficiently and accurately adjusted such that each locating guide 445 can be positioned in the corresponding aperture 440 in the removable extension bracket 405 so that there is sufficient spring force to urge the engaging member towards the corresponding locating dimple 480. This is beneficial in cases when, for example, the spring force of the compression spring deteriorates over time, such that the degree of compression can be adjusted using the adjustment screw 412, thereby prolonging the lifetime of the compression spring in the removable extension bracket 405. In addition, it will be appreciated that the compression springs and the one or more locating guides 445 may be easily removed and replaced if required.

The removable extension bracket 405 further comprises a stopper adapted to prevent the removable extension bracket 405 from applying a substantial force on the blade 20 in use. In the exemplary embodiment, and as shown in FIGS. 9 to 11, the stopper is a stopper plate 460 that is mounted to the bottom portion 407 of the removable extension bracket 405 using one or more screws 465, where it extends substantially across the bottom portion 407 of the removable extension bracket 405. In use, therefore, when the removable extension bracket 405 is slidingly received on one of the guide flanges 36' or 38' of the body 35, and the slot 425 concurrently receives the blade 20 therein, the stopper plate 460 abuts against a bottom portion 339 of the body 35, thus preventing the removable extension bracket 405 from substantially colliding with the blade 20 when it is slid onto one of the guide flanges 36' or 38'. This is beneficial in use, as the stopper plate 460 prevents the blade 20 and/or the slot 425 from becoming damaged over time by repeated removal and mounting of the removable extension bracket 405 on the guide flanges 36', 38' of the body 35 which could compromise the accuracy of the combination square 10 over time.

EMBODIMENTS

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" or "in an exemplary embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

TERMINOLOGY

In describing the preferred or exemplary embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Comprising and Including

In the claims which follow and in the preceding description of the invention, except where the context requires otherwise due to express language or necessary implication, the word "comprise" or variations such as "comprises" or "comprising" are used in an inclusive sense, i.e., to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

SCOPE OF INVENTION

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, the removable extension bracket may be adapted to be locked in a desired position relative to the body. Additionally, and as shown in, for example, FIGS. 12 and 13, one or more leveling bubble assemblies 600 may be provided as part of the body 35 to facilitate leveling of the combination square 10.

Although the invention has been described with reference to specific examples, it will be appreciated by those skilled in the art that the invention may be embodied in many other forms.

INDUSTRIAL APPLICABILITY

It is apparent from the above, that the arrangements described are applicable to the industries involving woodworking and metalworking.

The foregoing description and accompanying drawings illustrate the principles, exemplary embodiments, and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A combination square, comprising:
   a blade defining a longitudinal axis;
   a body comprising a slot adapted to receive the blade therein and permit sliding translation of the blade parallel to the longitudinal axis of the blade, allowing a position of the blade to be adjusted relative to the body;
   a lock comprising a locking pin and a locking arm, each movable between a locked position, in which the position of the blade is locked relative to the body in a locked configuration, and an unlocked position, in which the lock allows adjustment of the position of the blade relative to the body in a released configuration;
   the locking pin having a transverse extension and the locking arm having a cam portion; and
   the lock further comprising a clamp subassembly adapted to locate between the cam portion and the transverse extension, the clamp subassembly comprising a clamp member having a cam follower portion, the cam portion applying a force to the cam follower portion when the locking arm is in the locked position causing the locking pin to be held in the locked position and, thus, to maintain the lock in the locked configuration until the locking arm is moved towards the unlocked position.

2. The combination square according to claim 1, wherein the locking pin is moveable in the body in a direction generally parallel to the longitudinal axis of the body, between the locked position and the unlocked position.

3. The combination square according to claim 1, wherein:
   the blade comprises a longitudinal groove formed therein; and
   the locking pin comprises a protrusion at an engagement end thereof, the protrusion being adapted to engage with and slide in the groove.

4. The combination square according to claim 3, wherein the locking pin exerts:
   a lateral clamping force on the blade via the protrusion when the locking pin is in the locked position; and
   no clamping force when the locking pin is in the unlocked position.

5. The combination square according to claim 1, wherein the clamp subassembly further comprises a first biasing member located between the clamp member and the transverse extension.

6. The combination square according to claim 5, wherein the lock further comprises a biasing arrangement having a second biasing member that abuts the transverse extension, urging the transverse extension against the clamp subassembly.

7. The combination square according to claim 6, wherein the lock further comprises an adjustment screw for adjusting a degree of compression in the second biasing member.

8. The combination square according to claim 1, further comprising a removable extension bracket being wider than the body and being adapted to be slidingly received on the body.

9. The combination square according to claim 8, wherein:
the removable extension bracket comprises one or more working surfaces and one or more locating guides; and
the body further comprises one or more locating dimples, each locating dimple being adapted to receive one of the one or more locating guides therein for positively locating the removable extension bracket at a selected position along the body.

10. The combination square according to claim 8, wherein the removable extension bracket comprises a slot adapted to receive the blade therein and permit sliding translation of the body parallel to the longitudinal axis of the blade, allowing the position of the blade relative to the removable extension bracket to be adjusted.

11. The combination square according to claim 9, wherein the one or more locating guides each comprise an engaging member and a compression spring that abuts the engaging member, urging the engaging member against the corresponding locating dimple on the body.

12. The combination square according to claim 11, wherein the one or more locating guides each have a remote end and further comprise, at the remote end, an adjustment device for adjusting a degree of engagement of the compression spring.

13. The combination square according to claim 8, wherein the removable extension bracket further comprises a stopper adapted to prevent the removable extension bracket from applying a substantial force on the blade in use.

14. A combination square, comprising:
a blade defining a longitudinal axis;
a body comprising a slot adapted to receive the blade therein and permit sliding translation of the blade parallel to the longitudinal axis of the blade, allowing a position of the blade to be adjusted relative to the body; and
a lock module attachable to the body and comprising a locking pin and a locking arm, each movable in the lock module between a locked position, in which the position of the blade is locked relative to the body in a locked configuration, and an unlocked position, in which the lock module allows adjustment of the position of the blade relative to the body in a released configuration;
the locking pin having a transverse extension and the locking arm having a cam portion; and
the lock module further comprising a clamp subassembly adapted to locate between the cam portion and the transverse extension, the clamp subassembly comprising a clamp member having a cam follower portion, the cam portion applying a force to the cam follower portion when the locking arm is in the locked position causing the locking pin to be held in the locked position and, thus, to maintain the lock module in the locked configuration until the locking arm is moved towards the unlocked position.

15. The combination square according to claim 14, wherein:
the blade comprises a longitudinal groove formed therein; and
the locking pin comprises a protrusion at an engagement end thereof, the protrusion being adapted to engage with and slide in the groove.

16. The combination square according to claim 14, wherein the clamp subassembly further comprises a first biasing member located between the clamp member and the transverse extension.

17. The combination square according to claim 16, wherein the lock module further comprises:
a biasing arrangement having a second biasing member that abuts the transverse extension, urging the transverse extension against the clamp subassembly;
a remote end; and
at the remote end, an adjustment screw for adjusting a degree of compression in the second biasing member.

18. The combination square according to claim 17, wherein the biasing arrangement is adapted to allow movement of the locking pin to accommodate changes in distance between the cam portion and the clamp subassembly during rotation of the locking arm.

19. The combination square according to claim 14, further comprising a removable extension bracket being wider than and being adapted to be received on the body.

20. The combination square according to claim 19, wherein:
the removable extension bracket comprises one or more working surfaces and one or more locating guides; and
the body further comprises one or more locating dimples, each locating dimple being adapted to receive one of the one or more locating guides therein for positively locating the removable extension bracket at a selected position along the body.

21. The combination square according to claim 19, wherein the removable extension bracket comprises a slot adapted to receive the blade therein and permit sliding translation of the blade parallel to the longitudinal axis of the blade, allowing the position of the blade relative to the removable extension bracket to be adjusted.

* * * * *